United States Patent
Mackie

(10) Patent No.: US 9,673,530 B2
(45) Date of Patent: Jun. 6, 2017

(54) PORTABLE WIRELESS MESH DEVICE HAVING IMPROVED ANTENNA SYSTEM

(71) Applicant: OLEA NETWORKS, INC., Austin, TX (US)

(72) Inventor: David Mackie, Austin, TX (US)

(73) Assignee: Olea Networks, Austin, TX (US)

( * ) Notice: Subject to any disclaimer, the term of this patent is extended or adjusted under 35 U.S.C. 154(b) by 148 days.

(21) Appl. No.: 14/484,571

(22) Filed: Sep. 12, 2014

(65) Prior Publication Data

US 2015/0072628 A1 Mar. 12, 2015

Related U.S. Application Data

(60) Provisional application No. 61/876,875, filed on Sep. 12, 2013.

(51) Int. Cl.
*H01Q 9/04* (2006.01)
*H01Q 9/18* (2006.01)
(Continued)

(52) U.S. Cl.
CPC ............... *H01Q 9/18* (2013.01); *G01S 5/00* (2013.01); *G01S 5/0289* (2013.01); *H01Q 1/246* (2013.01);
(Continued)

(58) Field of Classification Search
CPC ........... H01Q 9/18; H01Q 1/42; G04B 1/3888
(Continued)

(56) References Cited

U.S. PATENT DOCUMENTS 3,804,210 A * 4/1974 Erickson ................. F16L 55/04
174/42
4,460,896 A * 7/1984 Shmitka ................... H01Q 9/04
333/235
(Continued)

FOREIGN PATENT DOCUMENTS

DE 19649215 6/1997
EP 0791977 8/1997

OTHER PUBLICATIONS

International Search Report & Written Opinion mailed Apr. 1, 2015 for PCT/US2014/055399.
(Continued)

*Primary Examiner* — Dameon E Levi
*Assistant Examiner* — AB Salam Alkassim, Jr.
(74) *Attorney, Agent, or Firm* — Egan, Peterman, Enders & Huston LLP.

(57) ABSTRACT

A wireless mesh network comprising a plurality of mobile mesh devices coupled as nodes in a mesh network topology is provided herein. Generally speaking, each mobile mesh device may be a portable, self-contained unit, which does not require network or power wiring to communicate network traffic between the nodes. According to one embodiment, the mobile mesh device may include a plurality of dipole antennas, which are enclosed within the mobile mesh device and configured to forward network traffic. At least one of the dipole antennas may be a frequency adjustable end-fed dipole antenna comprising a channel selection pin, which can be adjusted up or down along the dipole axis to change a resonant frequency of the dipole antenna. A method for setting or adjusting a resonant frequency of a frequency adjustable end-fed dipole antenna is also provided herein.

20 Claims, 14 Drawing Sheets

(51) Int. Cl.
| | |
|---|---|
| H04L 29/06 | (2006.01) |
| H04W 84/18 | (2009.01) |
| H04W 88/16 | (2009.01) |
| H04W 88/04 | (2009.01) |
| H04B 1/40 | (2015.01) |
| H04B 15/00 | (2006.01) |
| H04W 88/02 | (2009.01) |
| H01Q 1/24 | (2006.01) |
| H01Q 1/42 | (2006.01) |
| H01Q 9/14 | (2006.01) |
| H01Q 9/16 | (2006.01) |
| H01Q 9/22 | (2006.01) |
| H01Q 21/06 | (2006.01) |
| H01Q 5/307 | (2015.01) |
| H01Q 5/42 | (2015.01) |
| G01S 5/00 | (2006.01) |
| H04M 1/00 | (2006.01) |
| G01S 5/02 | (2010.01) |
| H04W 4/02 | (2009.01) |
| H04B 1/3888 | (2015.01) |

(52) U.S. Cl.
CPC .............. *H01Q 1/42* (2013.01); *H01Q 5/307* (2015.01); *H01Q 5/42* (2015.01); *H01Q 9/14* (2013.01); *H01Q 9/16* (2013.01); *H01Q 9/22* (2013.01); *H01Q 21/062* (2013.01); *H04B 1/40* (2013.01); *H04B 15/00* (2013.01); *H04L 65/00* (2013.01); *H04L 69/08* (2013.01); *H04M 1/00* (2013.01); *H04W 84/18* (2013.01); *H04W 88/02* (2013.01); *H04W 88/04* (2013.01); *H04W 88/16* (2013.01); *H04B 1/3888* (2013.01); *H04W 4/02* (2013.01)

(58) Field of Classification Search
USPC .................. 343/745, 749, 703, 895, 722
See application file for complete search history.

(56) References Cited

U.S. PATENT DOCUMENTS

| | | | | |
|---|---|---|---|---|
| 4,935,746 | A * | 6/1990 | Wells | H01Q 9/32 343/703 |
| 5,757,324 | A * | 5/1998 | Helms | H01Q 1/42 343/700 MS |
| 6,177,911 | B1* | 1/2001 | Yuda | H01Q 1/246 343/790 |
| 2003/0200623 | A1* | 10/2003 | Hung | E05F 1/1207 16/50 |
| 2005/0264464 | A1 | 12/2005 | Rankin | |
| 2006/0066455 | A1 | 3/2006 | Hancock et al. | |
| 2006/0250311 | A1* | 11/2006 | Bishop | H01Q 1/22 343/702 |
| 2012/0236786 | A1* | 9/2012 | Williams | H01Q 1/246 370/328 |

OTHER PUBLICATIONS

Partial International Search Report dated Dec. 23, 2014 for PCT/US2014/055399.

* cited by examiner

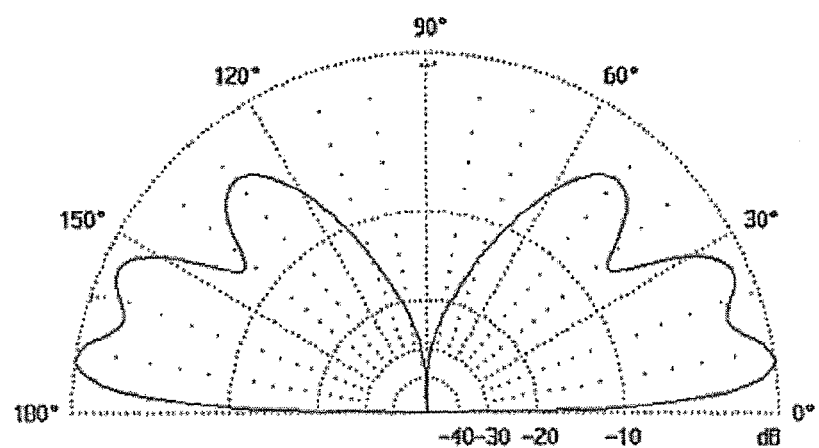
Exemplary Radiation Pattern
of Vertical Dipole Antenna 64
FIG. 6
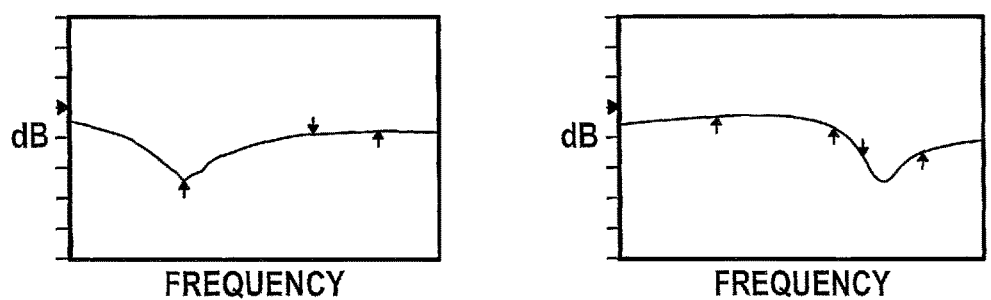
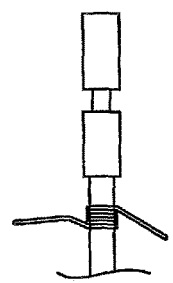
FIG. 8A
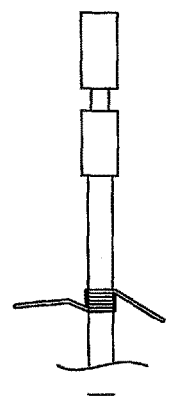
FIG. 8B

PORTABLE WIRELESS MESH DEVICE HAVING IMPROVED ANTENNA SYSTEM

PRIORITY CLAIM

The present application claims priority to prior U.S. Application No. 61/876,875 filed Sep. 12, 2013.

BACKGROUND OF THE INVENTION

1. Field of the Invention

The present invention generally relates to wireless mesh networks, and more particularly to a portable wireless mesh device that can be used to provide a temporary and/or rapidly deployable wireless mesh network.

2. Description of the Related Art

The following descriptions and examples are not admitted to be prior art by virtue of their inclusion within this section.

Wireless communication networks have gained widespread use in recent years. Among the commonly used forms of wireless networks are those that implement versions of Institute of Electrical and Electronics Engineers (IEEE) standard 802.11 (Wi-Fi), IEEE standard 802.15 (Bluetooth) and IEEE standard 802.16 (WiMAX). In general, there is a push in the industry to continually improve both the range and reliability of such networks.

One way to improve the range of a wireless network is to increase the transmission power of one or more nodes on the network. However, at least in the case of many wireless networks, regulations limit the amount of power that a node can use to transmit. Accordingly, another technique that has been used to improve the range of wireless networks is through mesh networking.

A wireless mesh network (WMN) is a communications network made up of a plurality of nodes organized in a mesh topology. As shown in FIG. 1, a wireless mesh network 10 often includes mesh routers (MR), gateways (G) and clients. A set of mesh routers create a wireless mesh backbone 12 that offers services to the clients directly through the mesh routers or gateways. Typical mesh clients 14 can be laptops, cell phones and other wireless devices, which are capable of connecting to the mesh backbone via a wired (e.g., Ethernet) or a wireless (e.g., Wi-Fi, WiMax, Bluetooth, Zigbee, GSM, etc.) communication interface. In some cases, different types of gateways/bridges can be included within the mesh network to provide both wired and wireless client access to the Internet 16, to other client devices 18, and to other wired and wireless networks 20. Examples of such networks may include, but are not limited to, other mesh networks, other wireless networks, cellular networks, and sensor networks. The mesh routers utilize a multi-hop routing protocol and generally function to forward traffic to and from the routers and gateways by "hopping" from one node to the next until the intended destination is reached.

Since each mesh node is connected to several other nodes, the mesh topology shown in FIG. 1 offers redundancy and improves the reliability of the communication network. In addition, the multi-hop routing protocol used by the mesh routers enables the mesh routers to dynamically adjust the routes traveled between nodes to circumvent any broken, blocked, or poorly-performing links along the path between a given source and destination node. As a result, mesh networks are inherently self-healing, in that they maintain communication even when a node breaks down or a link fails. In addition to self-healing, a mesh network is also self-forming and self-configuring, since the nodes in the network have the ability to automatically establish an ad hoc network and maintain mesh connectivity.

One drawback of conventional wireless mesh networks is that the mesh routers are typically fixed in place or have extremely limited mobility, since they generally require a wired connection to either an external network and/or a power source. This renders fixed wireless mesh networks, such as the one shown in FIG. 1, unsuitable for mobile mesh networking applications in which portability of the mesh routers is not only desired, but required to meet the needs of a given application.

For example, it may be desired to provide a temporary and/or rapidly deployable network of mobile mesh nodes to enable robust and reliable wireless connectivity in a variety of different applications. One such application may be to provide wireless connectivity in remote geographical areas having no existing, or very limited, communication infrastructure; or on large construction sites prior to the installation of permanent facilities from a network service provider. As it takes considerable time and cost for a network service provider to run new communication lines to a remote area or new construction site, providing a portable and rapidly deployable solution would offer immediate network connectivity, and thus, be highly desirable.

Another application in which a temporary and/or rapidly deployable wireless mesh network may be desirable is in public safety or disaster situations in which there is a loss of, or a need to supplement, the existing communication infrastructure. For example, it would be desirable to quickly and easily set up a temporary wireless mesh network in disaster locations that have lost communication and/or power, or in public safety situations that would benefit from additional communication, surveillance or sensor monitoring capabilities. In yet another application, a portable wireless mesh network may be useful in providing temporary connectivity for large public venues (such as outdoor festivals, events or fairs), inside buildings or even underground where wireless signal strength is degraded or non-existent.

In order to improve upon conventional wireless mesh networks and meet the needs of these application and others, a highly portable, self-contained wireless mesh device is needed to provide relatively quick and easy network access either outside or inside buildings with no network or power wiring required. In order to meet such need, the present invention provides a wireless mesh device (also referred to herein as a mobile mesh device) that can be deployed and configured for operation in a matter of minutes without the need for a skilled technician. In addition to providing quick and easy network connectivity, the wireless mesh device described herein may also provide location-aware functionality about devices using or within the vicinity of the network, supports remote site sensor monitoring and video surveillance, and is capable of local or remote configuration and management. Furthermore, the wireless mesh device described herein has a ruggedized, tamper-proof form factor that is weather resistant, and is designed to accept a variety of external peripheral attachments that may be used to further extend its capabilities and functionalities. Additional features/advantages of the wireless mesh device will become apparent upon reading this disclosure.

SUMMARY OF THE INVENTION

The problems outlined above are in large part solved by an improved wireless mesh device (referred to herein as a mobile mesh device) that can be used to provide a temporary and/or rapidly deployable wireless mesh network.

According to one embodiment, a wireless mesh network is provided herein with a plurality of mobile mesh devices (MMDs), which are coupled as nodes in a mesh network topology. Generally speaking, each mobile mesh device may be a portable, self-contained unit that does not require network or power wiring to communicate network traffic between the mesh nodes. This enables the mobile mesh devices to be picked up, carried and placed in almost any location (inside, outside or underground) that network connectivity is desired. In order to provide such a high degree of portability, the mobile mesh device described herein may be provided with a number of different power options (e.g., a power supply, a battery and/or a solar power input), and a number of IEEE 802.11 (e.g., a/b/g/n/s) and cellular (e.g., 3G, 4G, LTE, etc.) radio modules and antennas for communication purposes.

According to another embodiment, each mobile mesh device may include a plurality of end-fed dipole antennas, which are completely enclosed within a housing of the mobile mesh device and configured to forward network traffic. At least one of the end-fed dipole antennas may include a pin (referred to herein as a channel selection pin), whose position can be adjusted up or down along an axis of the end-fed dipole antenna to change the resonant frequency of the end-fed dipole antenna. This pin enables a user or technician of the wireless mesh network to tune or set the frequency of substantially all mobile mesh devices within the wireless mesh network to a particular (e.g., less noisy) channel within the operating frequency band of the end-fed dipole antenna.

In general, the end-fed dipole antenna may include a first radiative element and a second radiative element, which are coupled back to back at a center feed point of the end-fed dipole antenna, and a transmission feed line routed through the second radiative element along the axis. In one embodiment, the end-fed dipole antenna is a half-wave dipole, meaning that the total length of the radiative elements is approximately one-half ($\frac{1}{2}$) of a wavelength of the resonant frequency of the end-fed dipole antenna. In a half-wave dipole, the length of the first radiative element and the length of the second radiative element are each approximately equal to one-quarter ($\frac{1}{4}$) of a wavelength of the resonant frequency. Although implemented as a half-wave dipole in preferred embodiments, the end-fed dipole antenna is not limited to such and may be alternatively implemented in other embodiments.

One end of the transmission feed line of the end-fed dipole antenna is coupled to the center feed point for driving the first and second radiative elements, while an opposite end of the transmission feed line is coupled to an input connector of the end-fed dipole antenna. The transmission feed line comprises a plurality of markings, each corresponding to a different frequency or channel within an operating frequency band of the end-fed dipole antenna. Unlike conventional dipoles, the resonant frequency of the end-fed dipole antenna may be changed by adjusting the position of the channel selection pin from one of the plurality of markings to a different one of the plurality of markings.

According to one embodiment, the channel selection pin may be coupled onto the transmission feed line via a compressive force. For example, the channel selection pin may comprise a stiff metal wire formed so as to include a wound section, which is configured to provide the compressive force, and which is terminated at each end with a wire element that extends away from the wound section. In some embodiments, a length of each of the wire elements may be approximately equal to one-quarter ($\frac{1}{4}$) of a wavelength of the resonant frequency of the channel selection pin. In addition to providing a mechanism with which to easily tune the resonant frequency of the dipole antenna, the channel selection pin improves the antenna radiation pattern, reduces the number of side lobes and decreases the angle of radiation by providing a relatively high choking impedance to undesirable currents flowing on the exterior of the transmission feed line.

A method is also provided herein for setting or adjusting a resonant frequency of the end-fed dipole antenna disclosed herein. According to one embodiment, the method may generally include measuring one or more key performance indicators of a signal generated or received by a dipole antenna enclosed entirely within an external housing of a wireless communication device. The wireless communication device is preferably a mobile mesh device as described herein, but is not expressly limited to such. Sometime after the one or more key performance indicators are measured, the method may include adjusting a position of a channel selection pin to change the resonant frequency of the dipole antenna, if the one or more key performance indicators indicate that the dipole antenna is currently tuned to a busy or noisy frequency.

As noted above, the channel selection pin preferably includes a wound section coupled onto the transmission feed line of the dipole antenna via a compressive force and a pair of wire elements extending off each end of the wound section. In such embodiments, the position of the channel selection pin may be adjusted by squeezing the pair of wire elements together to remove the compressive force from the transmission feed line, sliding the channel selection pin up or down along the axis of the dipole antenna to a new position, and releasing the pair of wire elements to reapply the compressive force to the transmission feed line at the new position. The new position may be one of the plurality of markings on the transmission feed line, which corresponds to a different frequency or channel within the operating frequency band of the dipole antenna.

In some embodiments, one or more method steps may be performed prior to the step of adjusting the position of the channel selection pin. An example of such a step may be accessing the dipole antenna enclosed entirely within the external housing of the wireless communication device. In some embodiments, the dipole antenna may be accessed by removing one or more mechanical fasteners used to attach an upper compartment to a lower compartment of the external housing, and removing the upper compartment to access the dipole antenna. In other embodiments, the external housing of the mobile mesh device may consist of a single compartment coupled to a base, and the dipole antenna enclosed within the single compartment may be accessed by removing one or more mechanical fasteners used to attach the external housing to the base.

According to another embodiment, a mobile mesh device for use within a wireless mesh network is provided herein with an external housing consisting of an upper compartment coupled to a lower compartment via a plurality of mechanical fasteners. In this embodiment, the upper compartment is configured to be detached from the lower compartment and positioned a spaced distance away from the lower compartment. Unlike conventional wireless mesh devices that rely on externally mounted, weather-proof antennas, the mobile mesh device described herein includes a plurality of antennas, which are fully enclosed within the upper compartment of the mobile mesh device. The plurality of antennas are preferably mounted vertically onto a top surface of a common ground plane, which is retained within the upper compartment when the upper compartment is detached from the lower compartment. In some embodiments, one or more radio modules may be coupled to a bottom surface of the common ground plane and configured for transmitting and receiving network communications via the plurality of antennas.

In some cases, it may be beneficial to mount the plurality of antennas in an inverted ground plane configuration. According to one embodiment, the upper compartment may be configured for attachment to a mounting structure, which is arranged at an elevated location above the lower compartment of the mobile mesh device. To achieve the inverted ground plane configuration, the upper compartment may be attached to the mounting structure, so that the common ground plane is positioned above the plurality of antennas. This provides the advantage of directing the antenna radiation back down towards the ground. In some embodiments, signal loss may be avoided or substantially reduced by configuring the mounting structure so that it may house or accommodate the one or more radio modules when the upper compartment is attached thereto.

According to another embodiment, a mobile mesh device for use within a wireless mesh network is provided herein with a real-time locating system (RTLS) hardware/software engine, which is generally configured for capturing network traffic (e.g., data packets), determining the identity and location of the device transmitting the network traffic, and triggering an action in response to either the detected identity and/or the detected location of the transmitting device. The transmitting device may be a cellular device, a Wi-Fi enabled device or a RTLS tag. In some embodiments, the mobile mesh device may be configured for determining the identity of the transmitting device by detecting an address or device ID within the captured data packet. In some embodiments, the mobile mesh device may compare the address or device ID to a database of known or unknown network users to determine the identity of the transmitting device.

In some embodiments, the mobile mesh device may determine the location of the transmitting device within the wireless mesh network based on one or more data packets, which are captured and identified by a plurality of mobile mesh devices within the wireless mesh network. For example, the mobile mesh devices that "see" the transmitting device may determine the location of the transmitting device based on received signal strength measurements (or other key performance indicators). In some cases, a rough location may be determined from the mobile mesh device that measures the greatest signal strength. In other cases, a mobile mesh device may triangulate a rough location based on received signal strength measurements from itself and other mobile mesh devices, and may use its own GPS location to determine a more exact location of the transmitting device. In another example, a multilateration or trilateration technique based on time difference of arrival (TDOA) measurements performed by three or more mobile mesh devices may be used to locate the transmitting device.

In some embodiments, an action may be triggered by the identity and/or the location of the transmitting device. Exemplary actions that may be trigged include, but are not limited to, alerting a user to the identity and/or location of the transmitting device, logging the identity and/or location of the transmitting device, activating a camera to record video/audio at the location of the transmitting device, locking/unlocking a door, flipping a switch or valve, etc. As but one distinction over conventional wireless mesh networks, the mobile mesh device described herein provides RTLS services in a temporary and/or wireless mesh network without the need to first fingerprint or map the network coverage area. This saves significant time and cost in setting up the network, as site surveys and fingerprinting are not needed to accurately determine the location of transmitting devices within the wireless mesh network.

According to another embodiment, a mobile mesh device for use within a wireless mesh network is configured for intercepting cellular signals, converting the cellular signals into another communication protocol, and re-routing the converted cellular signals throughout and beyond the wireless mesh network. In some embodiments, the mobile mesh device may include a small cell gateway (e.g., a femtocell) for capturing or intercepting the cellular signals, converting the cellular signals into an IEEE 802.11 communication protocol and re-routing cellular signals throughout and beyond the wireless mesh network. In some embodiments, a Voice-over-Internet Protocol (VoIP) gateway and/or a satellite modem may also be included for re-routing the cellular signals over the Internet or a satellite link.

In some embodiments, the small cell gateway may be combined with the RTLS hardware/software engine described above to automatically reroute cellular signals upon detecting a nearby cellular device. In such embodiments, the mobile mesh device may be configured for capturing data packets transmitted from a cellular device located within the vicinity of the wireless mesh network, determining an identity of the cellular device based on information obtained from the captured data packet, and depending on security parameters of the wireless mesh network, automatically performing the steps of intercepting cellular signals from the cellular device, converting the cellular signals into another communication protocol, and re-routing the converted cellular signals throughout and beyond the wireless mesh network.

Additional unique aspects of the mobile mesh device will become apparent upon reading the disclosure herein.

BRIEF DESCRIPTION OF THE DRAWINGS

Further advantages of the present invention may become apparent to those skilled in the art with the benefit of the following detailed description of the preferred embodiments and upon reference to the accompanying drawings in which:

FIG. 6 is a plot illustrating the antenna radiation pattern of the vertical dipole antenna of FIG. 5, according to one embodiment;

FIGS. 8A and 8B are photographs illustrating how the resonant frequency of the vertical dipole antenna of FIG. 5 may be altered by changing the position of the channel selection pin along the transmission feed line;

Figure 1:
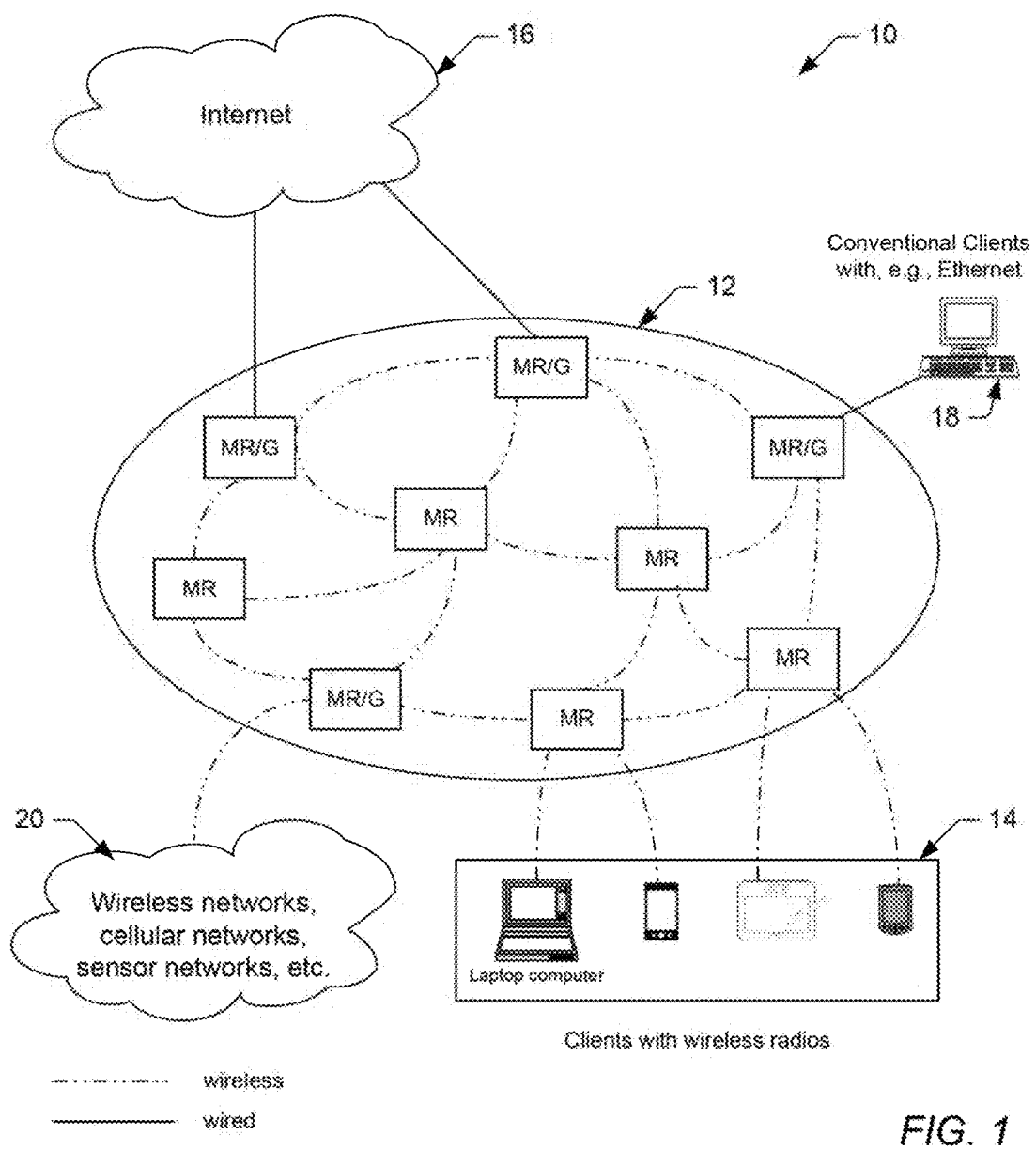
FIG. 1 a block diagram of a conventional wireless mesh network comprising nodes with fixed or very limited mobility.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 2:
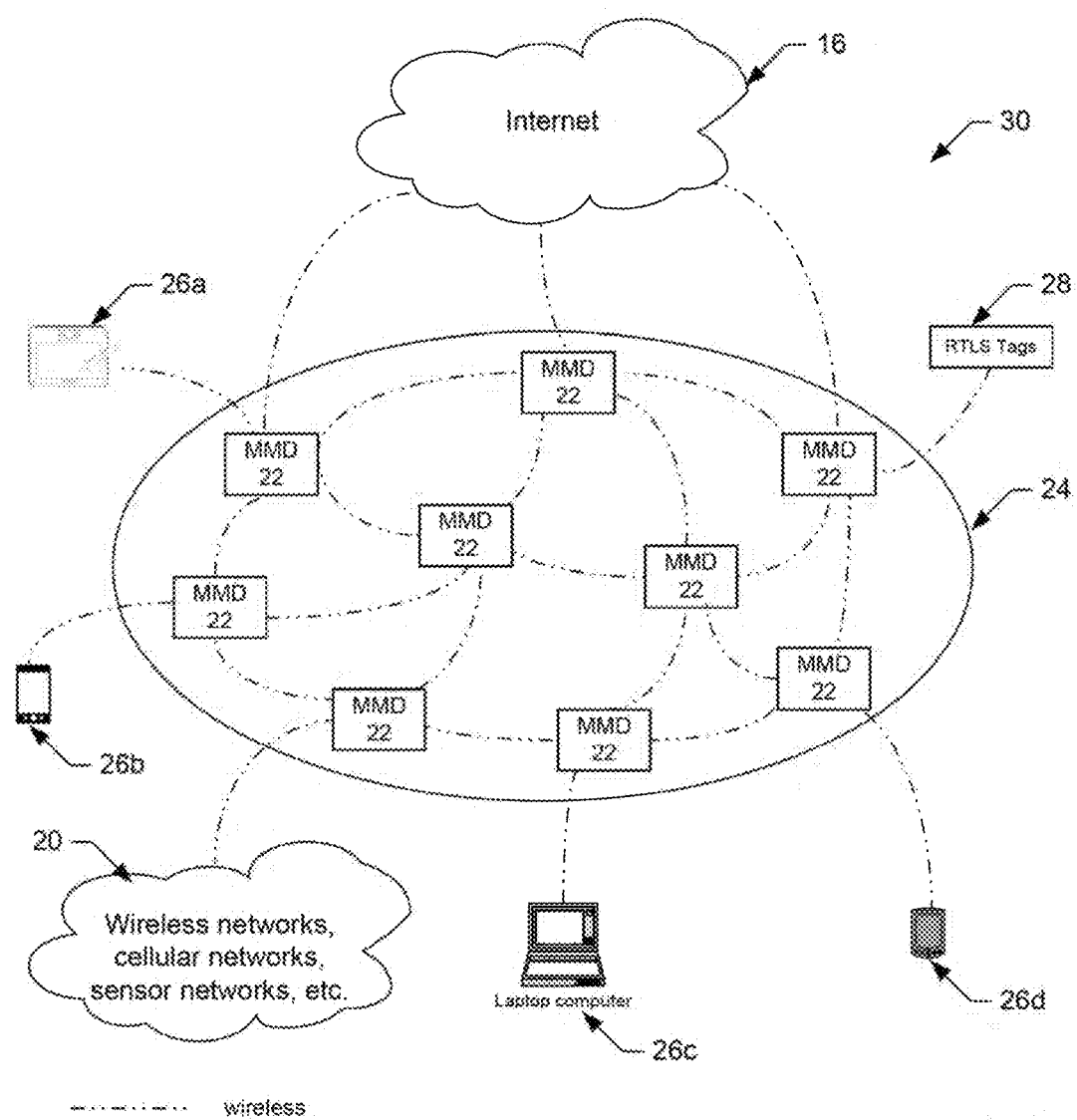
FIG. 2 is a block diagram of a wireless mesh network comprising portable, self-contained wireless mesh devices (also referred to herein as a mobile mesh devices, or MMDs) that, according to one embodiment, do not require network or power wiring.

FIG. 2 illustrates an improved wireless mesh network 30 comprising a plurality of portable, self-contained wireless mesh devices 22 (referred to hereinafter as mobile mesh devices, or MMDs), which can be used to provide a temporary and/or rapidly deployable wireless mesh network. Similar to the wireless mesh routers (MRs) shown in FIG. 1, the mobile mesh devices 22 used within the wireless mesh network 30 of FIG. 2 provide a self-forming, self-configuring and self-healing network of mesh nodes. These nodes are organized in a mesh topology and create a wireless mesh backbone 24 that offers services to client devices 26, e.g., by providing wireless client access to the Internet 16, to other client devices 26, and to other wired or wireless networks 20 (which may include, but are not limited to, other mesh networks, other wireless networks, cellular networks, and sensor networks). Like the wireless mesh routers (MRs) shown in FIG. 1, the mobile mesh devices 22 shown in FIG. 2 utilize a multi-hop routing protocol to forward traffic by "hopping" from one node to the next until the intended destination is reached.

As noted above, the conventional wireless mesh network 10 shown in FIG. 1 generally includes a number of wireless routers (MRs), gateways (Gs) and/or bridges, and thus, includes a set of heterogeneous nodes fulfilling different network roles. While some of the nodes in network 10 may provide wired or wireless client access to an Internet gateway or a client device served by another network node in the same mesh network, other nodes may only have a backhauling functionality. This means that their sole purpose is to forward other MR's packets and they do not serve any client device directly.

Unlike the wireless mesh network 10 of FIG. 1, the wireless mesh network 30 of FIG. 2 is generally made up of similarly configured mobile mesh devices 22, each having substantially the same hardware/software components for fulfilling similar network roles. Providing a set of substantially homogenous mobile mesh devices 22, as shown in FIG. 2, enables a client device 26 to access the mesh network 30 via any of the mobile mesh devices 22, and provides every mobile mesh device 22 with the ability to directly access the Internet 16, other client devices 26 and other networks 20. As used herein, "substantially homogenous" means that each of the mobile mesh devices 22 included within the network 30 may include substantially the same hardware and software components and/or may be configured to provide substantially the same functionality. However, the wireless mesh network 30 shown in FIG. 2 is not restricted to including only substantially homogenous mobile mesh devices 22, and may in some embodiments include one or more mobile mesh devices having reduced or different functionality. Preferred and alternative embodiments of mobile mesh devices will be discussed in more detail below.

Unlike the wireless mesh routers (MRs) shown in FIG. 1, which are typically installed in a fixed location, the mobile mesh devices 22 of FIG. 2 do not require network or power wiring, and thus, are highly portable, self-contained units. This enables each of the mobile mesh devices 22 in the network 30 to be picked up, carried and placed in almost any location (inside, outside or underground) that network connectivity is desired. In order to provide such a high degree of portability, the mobile mesh device 22 may be provided with a number of different power options (discussed in more detail below). Although an Ethernet port may be included in some embodiments for wired network access, Power over Ethernet (PoE) applications, or connection to peripheral attachments, the Ethernet port is not required for network connectivity and may be considered an optional feature of the mobile mesh devices described herein. This represents a major distinction over conventional wireless mesh networks, even those intended for mobile applications, in which at least a root node is required to have wired network access.

As shown in FIG. 2, the mobile mesh device 22 preferably includes a number of IEEE 802.11 (e.g., a/b/g/n/s) and cellular (e.g., 3G, 4G, LTE, etc.) radio modules and associated antennas for wireless and cellular access, mesh provisioning and routing, and location based services. As described in more detail below, the location based services included within the mobile mesh devices 22 may enable the mobile mesh devices 22 to track Wi-Fi enabled client devices 26 and/or RTLS tags 28 in order to identify and manage physical device assets and people within the vicinity of the wireless mesh network 30, and/or to provide remote sensor monitoring or surveillance within the network.

Figure 3:
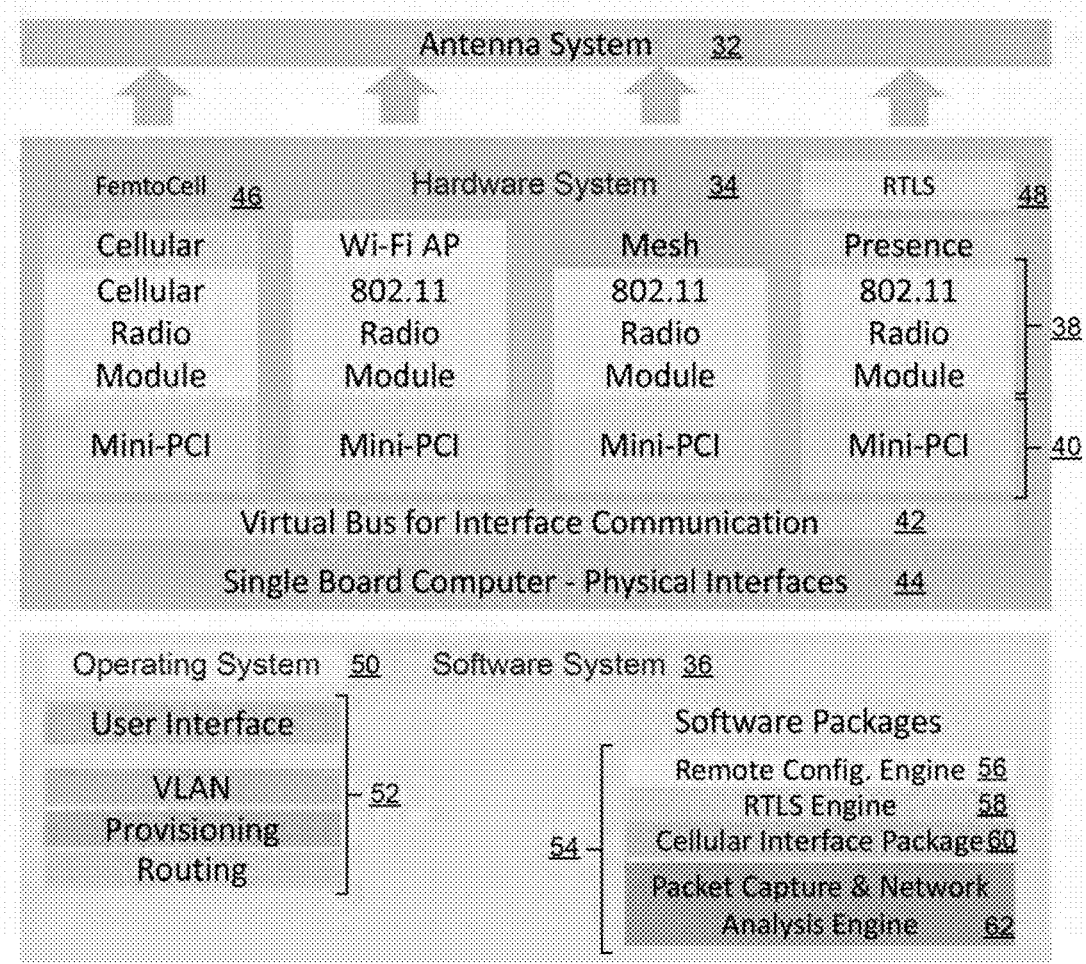
FIG. 3 is a high level system diagram of the mobile mesh device (MMD) shown in FIG. 2, according to one embodiment.

FIG. 3 is a high level system diagram illustrating one exemplary embodiment of the mobile mesh device (MMD) 22 of FIG. 2. As shown in FIG. 3, the mobile mesh device 22 may be broken down into three major areas: the antenna system 32, the hardware system components 34, and the software system components 36. Each of these components will be described in more detail below. However, one skilled in the art would understand that, while the following description focuses on the components needed to perform the claimed functionality, the mobile mesh device 22 is not limited to only those components shown and described herein, and may include many others.

An Exemplary Embodiment of an Antenna System within a Mobile Mesh Device

Traditional wireless mesh networks, such as the one shown in FIG. 1, have been known to use a variety of different types of antennas to forward network communications across the mesh. These antennas have included, for example, omni-directional antennas, directional (fixed beam) antennas, and adaptive antenna arrays (also referred to as smart antennas), in which the antenna beam width, pattern and gain has been preselected or tailored to meet a specific purpose. In some cases, a number of antennas have been included within a traditional mesh node to implement a multiple input multiple output (MIMO) system (i.e., a system including a plurality of antennas for both transmission and reception), or a multi-radio/multi-channel system (i.e., a system utilizing different radio techniques and/or different transmission frequencies).

However, traditional wireless mesh networks generally use wideband (WB) or ultra wideband (UWB) antennas within the nodes and rely on advanced radio techniques, such as reconfigurable radios, frequency agile/cognitive radios, and even software radios to set or change the frequency, gain or bandwidth of the WB/UWB antennas. Although these advanced radio techniques provide some measure of improved performance, a need remains for an improved antenna design that provides less noise, higher bandwidth, improved throughput and greater distance than is currently possible with known antenna/radio combinations.

Figure 4:
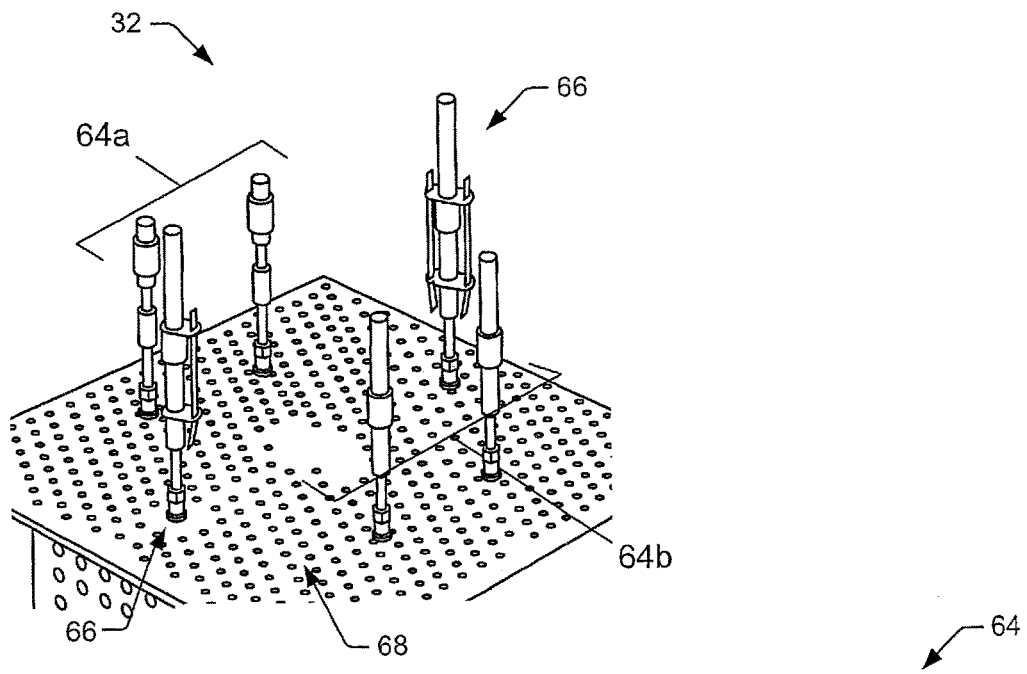
FIG. 4 is a photograph showing a plurality of antennas mounted within the mobile mesh device described herein.

FIGS. 4-8 illustrate exemplary embodiments of an antenna system 32 and antenna design that improves upon antenna/radio combinations commonly used in wireless mesh devices. As shown in FIG. 4, a number of vertical dipole antennas (e.g., 2 or more) may be included within the mobile mesh device 22. In general, the number of antennas included within the mobile mesh device 22 depends on a number of factors, such as the number of radio modules included within the mobile mesh device 22, the number of supported frequency bands, etc. Although illustrated in FIG. 4 as including a particular number of antennas configured for operating over a particular number of frequency bands, one skilled in the art would understand how the antenna system 32 may be alternatively designed to include any number of antennas configured for operating over any number of similar or different frequency bands.

In the particular embodiment of FIG. 4, the antenna system 32 is shown as including four frequency adjustable, end-fed vertical dipole antennas 64 for wireless area network (e.g., IEEE 802.11a/b/g/n/s) communications and two shock-excited vertical dipole antennas 66 for cellular communications (e.g., 3G, 4G, LTE). The six antennas included in the embodiment of FIG. 4 are mounted vertically onto a mounting plate 68 that acts as a ground plane.

According to one embodiment, the four frequency adjustable, end-fed vertical dipole antennas 64 may include two 2.4-2.5 GHz antennas 64a (e.g., IEEE 802.11b/g/n) and two 5-5.8 GHz antennas 64b (e.g., IEEE 802.11a/n/s). In some embodiments, the two 2.4-2.5 GHz antennas 64a may be used for client presentation of 802.11 data, and the two 5-5.8 GHz antennas 64b may be used for mesh connectivity. In other embodiments, the roles of the 2.4-2.5 GHz and 5-5.8 GHz antennas may be reversed, or a different combination of antennas may be used for client data and mesh connectivity. Using separate frequency bands for mesh connectivity and client presentation of wireless data provides the advantages of not having to share the mesh frequency with the client traffic, and demonstrates a distinction over some traditional wireless mesh devices that use the same frequency band for both client data and mesh connectivity.

As traditional wireless mesh devices hop from one to another, the bandwidth available for client traffic is drastically reduced (sometimes by half), due to the fact that the mesh router has to carry its own traffic, as well as the traffic of the upstream router, and the overhead of TCP/IP, which is only about 40% efficient in the IEEE 802.11 protocol. If separate frequency bands are used for mesh connectivity and client traffic, as described herein, a clean channel is provided to dramatically increase the amount of backhaul traffic that can be accommodated by the mobile mesh devices. In other words, using separate frequency bands enables the full spectrum to be available for backhaul traffic, which enables the use of fat channel and other protocol enhancements that can increase the speed in the mesh. This is especially beneficial in high traffic areas where the number of retries increases and the general speed of the network decreases to deal with the added interference and noise.

Including two antennas for mesh connectivity (e.g., the two 5-5.8 GHz antennas) represents another distinction over traditional wireless mesh devices, which typically use only one antenna for the mesh. It is also worth noting that, while the mobile mesh device 22 is described herein as including a plurality of frequency adjustable, end-fed vertical dipole antennas 64 for operating over the 2.4 GHz and 5 GHz frequency bands, the plurality of antennas 64 shown in FIG. 4 may be alternatively configured for operating over only the 2.4 GHz band, only the 5 GHz band, or over another frequency band or bands possibly utilizing a substantially different communication protocol.

Figure 5:
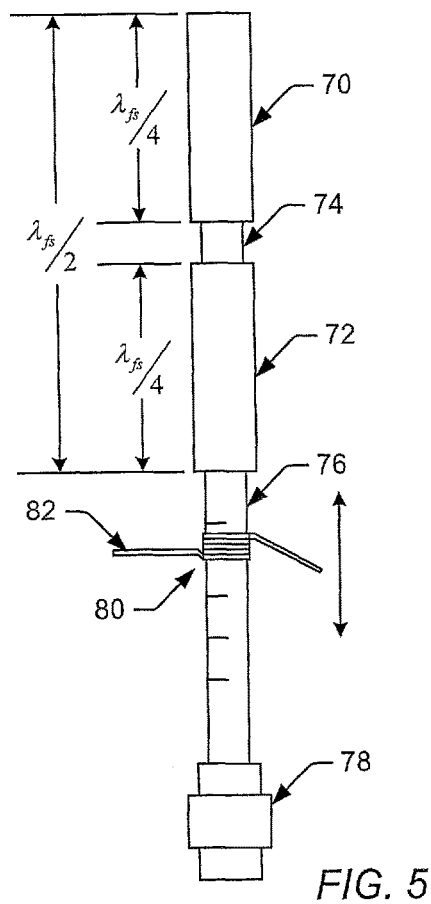
FIG. 5 is a plan diagram illustrating one embodiment of a vertical dipole antenna having a channel selection pin for adjusting a resonant frequency of the vertical dipole antenna.

FIG. 5 is a plan diagram illustrating one exemplary design of a frequency adjustable, end-fed vertical dipole antenna 64 that may be used for wireless area network communications, according to one embodiment. As described in more detail below, one or more of the 2.4 GHz and 5 GHz antennas shown in FIG. 4 is preferably implemented as a frequency adjustable, end-fed vertical dipole antenna 64.

As known in the art, a vertical dipole antenna may be formed by coupling two ¼-wavelength conductors, or radiative elements 70/72, back to back for a total length of $\lambda_{fs}/2$, where $\lambda_{fs}$ is the free space wavelength of the antenna radiation. Dipoles whose total length is one-half the wavelength of the radiated signal are called ½-wave dipoles, and in many cases, the term "dipole" is synonymous with "½-wave dipole." As the length of the radiative elements is determined by the wavelength of the desired antenna radiation, longer radiative elements 70/72 are used to implement a 5 GHz antenna, whereas comparatively shorter radiative elements 70/72 are used to implement a 2.4 GHz antenna. According to one embodiment, radiative elements 70/72 may each be about 1 inch in length when implementing a 5 GHz antenna and about 0.5 inches in length when implementing a 2.4 GHz antenna. Alternative lengths may be used to implement a ½-wave dipole antenna configured to operate in other frequency bands. Although a ½-wave dipole is shown and described herein, one skilled in the art would understand how the vertical dipole antenna 64 may be alternatively designed to exhibit an overall dipole length of $\lambda_{fs}(m/2)$, where m is an integer greater than or equal to 1.

There are generally two types of vertical dipole antennas known in the art: center-fed dipole antennas and end-fed dipole antennas. An end-fed dipole provides certain advantages over a center-fed design and is shown in the embodiment of FIG. 5 and described in more detail below.

As known in the art, the radiative elements 70/72 of an end-fed dipole antenna 64 are driven at a center feed point 74 via a transmission feed line 76 (e.g., a rigid coax cable), which is routed through the lower radiative element 72 along the dipole axis (i.e., the longitudinal axis of the dipole antenna). The length and characteristic impedance of the transmission feed line 76 is specifically designed to provide impedance transformation and compensation for the dipole antenna. At the distal end of the transmission feed line 76, an input connector 78 is provided to connect the antenna to a radio frequency source, such as one of the radio modules 38 shown in FIG. 3.

An end-fed dipole provides known advantages over a center-fed dipole. For example, routing the transmission feed line 76 along the dipole axis prevents the transmission feed line from interfering with the antenna radiation pattern in the H-plane (i.e., the plane perpendicular to the dipole axis), thus enabling an end-fed dipole to produce a nearly perfect isotropic radiation pattern in the H-plane. However, it is generally necessary to employ some sort of "choke" at the lower radiating element 72 of the end-fed dipole to prevent the antenna current from inducing common mode currents on the exterior of the transmission feed line 76 and distorting the radiation pattern in the E-plane (i.e., the plane parallel to the dipole axis).

In some conventional dipoles, one or more ferrite beads are added between the lower radiative element 72 and the connector 78 to choke off the common mode current induced by the dipole. While this method may be sufficient at relatively low frequencies (e.g., frequencies up to about 100 MHz), ferrite choke beads cannot be used at significantly higher frequencies, including the 2.4-5.8 GHz bands, since the beads are typically very lossy and cannot provide high choking impedances at such high frequencies.

The antenna design shown in FIG. 5 improves upon conventional end-fed dipoles by using an adjustable channel selection pin 80 to not only improve dipole performance by choking off the undesirable currents flowing on the outside of the transmission feed line 76, but to also provide a mechanism with which to tune or adjust the resonant frequency of the dipole, itself.

According to one embodiment, the channel selection pin 80 may be formed by winding an appropriately stiff metal wire a number (N) of turns on a cylindrical form having a diameter slightly less than the diameter of the rigid coax transmission feed line 76. The number N is chosen to provide a sufficient clamping or compressive force on the transmission feed line 76 when the wound section of the channel selection pin 80 is arranged thereon, and may include approximately 2-10 turns. More importantly, the wound section of the channel selection pin 80 is terminated at both ends with a pair of ¼ wavelength wire elements 82, which extend off each end of the wound section forming "whiskers." The length (e.g., ¼ wavelength) of the short wire elements or "whiskers" 82 is chosen to provide a relatively high choking impedance near its ¼ wave resonance frequency. According to one embodiment, the length of the short wire elements 82 may be approximately 0.5 inches, but may vary depending on frequency. By precisely configuring and positioning the channel selection pin 80 between the lower radiative element 72 and the connector 78, the undesirable currents flowing along the outside of the transmission feed line 76 can be choked off to improve antenna performance by reducing unwanted radiation from the coax and improving the impedance match at desired frequencies. This results in radiation pattern improvement, cleaning up of spurious lobes and lowering the angle of radiation.

FIG. 6 is a plot illustrating an exemplary radiation pattern provided by the frequency adjustable, end-fed vertical dipole antenna 64 when mounted over a ground plane, such as the antenna mounting plate 68 shown in FIG. 4. In particular, FIG. 6 shows the radiation pattern of the vertical dipole antenna 64 as having a substantially flat main lobe with minimal side lobes and a relatively low (i.e., substantially horizontally directed) angle of radiation. In the illustrated embodiment, the angle of radiation is shown to be about 60° for a 5-5.5 GHz vertical dipole antenna 64b when the channel selection pin 80 is positioned to set the resonant frequency of the antenna to approximately 5.2 GHz. The reduction in side lobes and the lower angle of radiation is due, at least in part, to the addition of the channel selection pin 80 along the dipole axis of the antenna 64. By including pin 80, the majority of the radiated power is substantially directed along the horizontal plane, which is advantageous within the wireless mesh network 30 of FIG. 2, since most if not all of the mobile mesh devices 22 will be placed on or about the same plane (e.g., the floor).

In addition to improving radiation characteristics, the channel selection pin 80 enables the vertical dipole antennas 64 to be tuned to a particular resonant frequency by moving the pin 80 to a different position along the dipole axis. For example, it is well known that the 2.4 GHz and 5 GHz frequency bands are unregulated, and thus, are typically very congested. Even in conventional wireless mesh devices, which use separate frequency bands (such as the 2.4 GHz and 5 GHz frequency bands) for mesh provisioning and client traffic, interference and noise within those frequency bands can significantly degrade mesh performance. In order to communicate successfully amongst one another, the mobile mesh devices 22 described herein are preferably set or tuned to a non-busy or less noisy channel within a given frequency band by adjusting the channel selection pin 80 on one or more of the vertical dipole antennas 64 included within the mobile mesh devices 22. The ability to configure the mobile mesh devices 22 to use a non-busy frequency/channel within the 2.4 GHz and/or 5 GHz frequency bands is particularly advantageous, and represents a major distinction over conventional wireless mesh devices.

It is well known that the 2.4 GHz and 5 GHz frequency bands are separated into a number of smaller (20 MHz) frequency bands, or channels. In order to communicate amongst one another, the mobile mesh devices 22 may be set to the same channel or channels, which has/have been determined to be the least noisy. This may be achieved, in preferred embodiments, by setting or adjusting the resonant frequency of the vertical dipole antenna 64 (i.e., the 2.4 GHz antenna, the 5 GHz antenna, or both) by adjusting the position of the channel selection pin 80. A user or technician may set the resonant frequency of the vertical dipole antenna 64 when the mobile mesh device 22 is initially deployed, or may later change the resonant frequency of the vertical dipole antenna 64 to avoid network congestion in the 2.4 GHz and/or 5 GHz frequency band.

As shown in FIG. 5, the position of the channel selection pin 80 may be adjusted along the dipole axis to change the resonant frequency of the vertical dipole antenna 64. This can be easily accomplished by an unskilled technician by squeezing the whiskers, which opens the turns slightly and enables the channel selection pin 80 to be slid up or down the dipole axis. When the whiskers are released, the channel selection pin 80 is held in place by compressive forces and grounded to the rigid coax transmission feed line 76 at the new location. As shown in FIG. 5, a number of notches, lines or alternative markings may be provided along the lower portion of transmission feed line 76 to assist the user in adjusting the resonant frequency of the antenna by changing the location of the channel selection pin 80. Each notch, line or marking may correspond to a different frequency or channel within the operating frequency range. These markings may be predetermined by a manufacturer of the antenna through a calibration process, or may be based on a reference design. In some cases, the markings may denote a specific frequency, not a progression of frequencies from low to high or vice versa.

Figure 7:
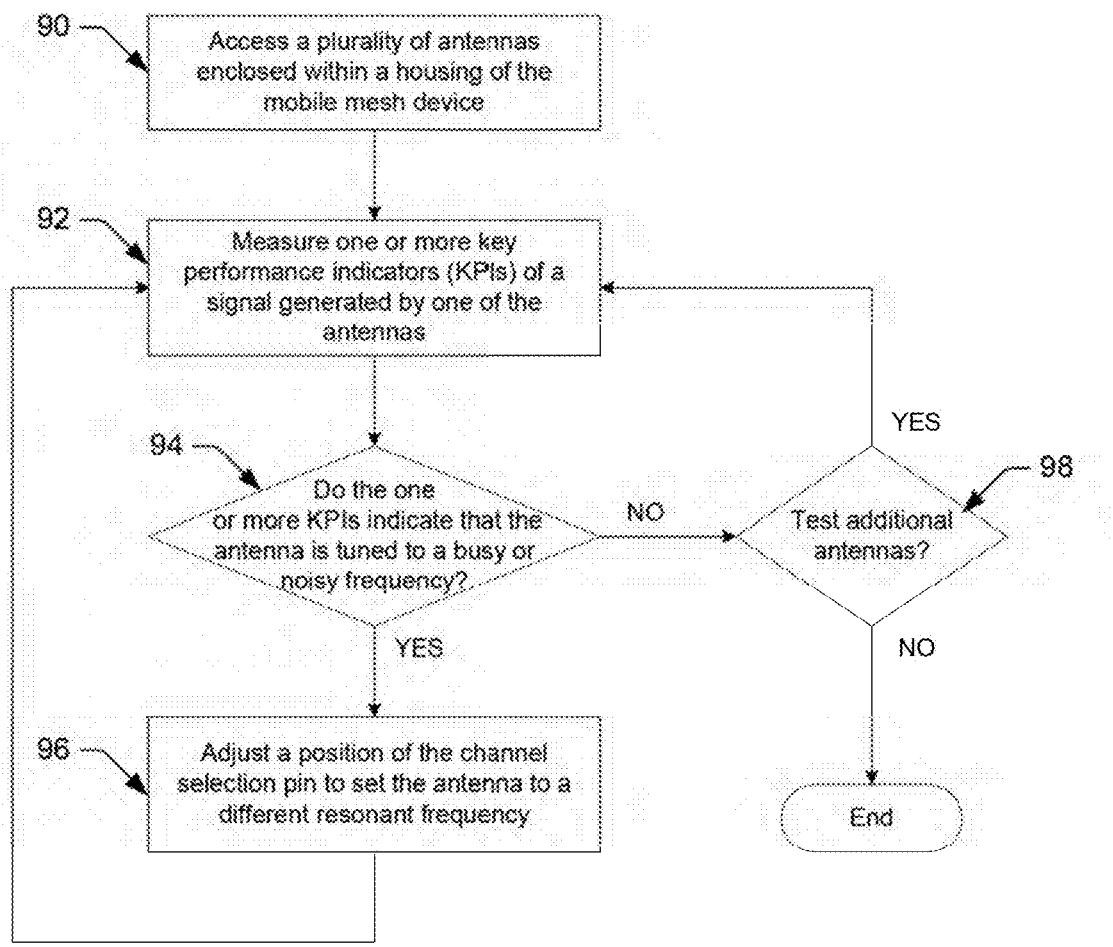
FIG. 7 is a flowchart diagram illustrating one embodiment of a method for setting or adjusting a resonant frequency of a vertical dipole antenna.

According to one embodiment, a method for setting or adjusting the resonant frequency of one or more vertical dipole antennas 64 may involve accessing the antennas located within the mobile mesh device 22 (in step 90 of FIG. 7). For example, and as described in more detail below, the antennas 64/66 of the mobile mesh device 22 are preferably enclosed within an exterior housing of the mobile mesh device 22. In some embodiments, the antennas enclosed within the mobile mesh device 22 may be accessed by removing one or more mechanical fasteners (e.g., screws, nuts and bolts, latches, clips, etc.) used to attach an upper compartment of the mobile mesh device to a lower compartment (or base) of the mobile mesh device. Once the mechanical fasteners are removed, the upper compartment may be removed to gain access to the antennas enclosed therein.

In some embodiments, a user or technician may use a diagnostic software program or tool, which is designed to measure one or more key performance indicators of a signal generated or received by the vertical dipole antenna 64 (in step 92) to estimate the performance of the vertical dipole antenna 64 in the environment in which the mobile mesh device 22 is currently located. The diagnostic software program or tool may reside within the mobile mesh device 22, within a separate test device (e.g., a spectrum analyzer), or a combination of the two. In some embodiments, the key performance indicators may be measured (in step 92) before the plurality of antennas are accessed (in step 90).

Examples of key performance indicators include, but are not limited to, the received signal strength indicator (RSSI), the reference symbol received power (RSRQ), the reference signal received quality (RSRQ) and the signal to noise ratio (SNR). In some embodiments, one or more of the key performance indicators may be used to determine if a vertical dipole antenna 64 is tuned to a busy/noisy frequency or channel. Although it is possible to measure one or more key performance indicators, the best estimation of antenna performance may be gained by using all four key performance indicators. When all four key performance indicators are considered, the user or technician (or the diagnostic software program/tool) can determine the best setup location and orientation of the mobile mesh device 22 in its current operating environment, in addition to determining the best (i.e., least noisy) resonant frequency or channel with which to communicate or provision the mesh.

If one or more of the key performance indicators shows that the vertical dipole antenna 64 is currently tuned to a busy or noisy frequency (YES branch of step 94), the technician may adjust the position of the channel selection pin 80 (in step 96) to change the resonant frequency of the vertical dipole antenna 64. This may be achieved, in some embodiments, by squeezing the whiskers 82, sliding the pin 80 up or down, and releasing the whiskers 82 to reposition the pin 80 at a new location designated by one of the notches or lines shown on the lower portion of the transmission feed line 76. The chosen notch or line may correspond to a particular resonant frequency or channel that was determined by the technician or the diagnostic program/tool to be the least noisy.

In some embodiments, the technician may check the diagnostic program/tool to determine if one or more of the key performance indicators of the signal generated or received by the vertical dipole antenna 64 has improved (e.g., by repeating steps 92 and 94). If the one or more key performance indicators have improved, the technician may set corresponding antennas of the other mobile mesh devices 22 to the same channel or channels. For example, if the method described above was performed to determine the optimum resonant frequency for a 2.4 GHz antenna included within a first mobile mesh device for communicating client data, the 2.4 GHz antennas used for communicating client data within all other mobile mesh devices may be tuned to the same resonant frequency to effectuate communication there between. If the diagnostic program/tool indicates that the key performance indicator(s) have not improved, the technician may repeat steps 92, 94 and 96 of the method described above to find an alternative frequency for the antenna under test. If additional antennas are to be tested (YES branch of step 98), steps 92, 94 and 96 may be repeated to determine an optimum resonant frequency for each of the frequency adjustable, end-fed vertical dipole antennas 64 included within the mobile mesh device 22.

FIGS. 8A-8B are graphs illustrating how the resonant frequency of the vertical dipole antenna 64 may be altered by moving the channel selection pin 80 to a new location along the transmission feed line 76. In general, the graphs shown in FIGS. 8A-8B illustrate how the resonant frequency (shown as a dip in the line) is decreased by sliding the channel selection pin 80 up the transmission feed line 76 (FIG. 8A), and increased by sliding the channel selection pin 80 down the transmission feed line 76 (FIG. 8B). The notches or lines included on the transmission feed line 76 may correspond, in some embodiments, to a set of channels within the 2.4 or 5 GHz space. However, the notches or lines included on the transmission feed line 76 do not necessarily correspond to a sequential set of channels. In the particular graphs shown in FIGS. 8A-8B, the channel selection pin 80 shown in FIG. 8A is positioned on a notch corresponding to channel 48 (i.e., 5.24 GHz), while the channel selection pin 80 shown in FIG. 8B is positioned on a notch corresponding to channel 56 (i.e., 5.28 GHz). One skilled in the art would understand how the vertical dipole antenna 64 can be configured to include substantially any number of notches corresponding to any set of available channels within substantially any frequency band.

The ability to quickly and easily tune the vertical dipole antennas 64 to a non-busy frequency or channel by using an adjustable channel selection pin 80 distinguishes the mobile mesh device 22 over conventional devices that use broadband antennas and advanced radio techniques (such as software radios) to adjust the frequency of the mesh. In addition to avoiding network congestion, the antenna design and method described herein provides less noise, higher bandwidth, improved throughput and greater distance than is currently possible with known antenna/radio combinations. By avoiding congested frequencies and lowering the noise floor, the frequency adjustable vertical dipole antenna 64 provides significantly more efficient communication than its conventional counterparts.

This higher communication efficiency enables an overall smaller antenna 64 to be used without sacrificing performance. According to one embodiment, the overall length of the vertical dipole antennas 64 may range between about 3.0 inches and about 3.5 inches, depending on frequency. The ability to use a significantly smaller antenna 64 provides several advantages. First, it enables the size of the mobile mesh device 22 to be smaller than conventional wireless mesh devices using higher gain, larger antennas. More importantly, however, it enables the antennas to be fully enclosed within an external housing of the mobile mesh device 22, which is both rugged and weather-proof. This significantly reduces the cost of the mobile mesh device 22 by avoiding the use of the much larger, externally mounted, weather-proof antennas typically used in conventional wireless mesh devices.

A First Exemplary Embodiment of a Mobile Mesh Device

Additional structural and electrical features of the mobile mesh device 22 are shown in FIGS. 9-16. Generally speaking, the mobile mesh device 22 is preferably designed to have a form factor that is ruggedized, tamper-proof, weather resistant and easily portable. In some embodiments, the mobile mesh device 22 may be configured to accept (or attach to) a variety of different peripheral attachments. In some embodiments, the mobile mesh device 22 may be configured for placement onto a horizontal surface (e.g., a floor or table). In other embodiments, the mobile mesh device 22 may comprise anchoring structures for attaching the mobile mesh device 22 to a surface upon which the device is placed or mounted. In some embodiments, an external housing of the mobile mesh device 22 may be configured so as to enclose all of the device components within a single compartment. In other embodiments, the external housing of the mobile mesh device 22 may be configured to enclose all of the device components within two distinct compartments, which may be detached and spaced apart, if desired.

Figure 9:
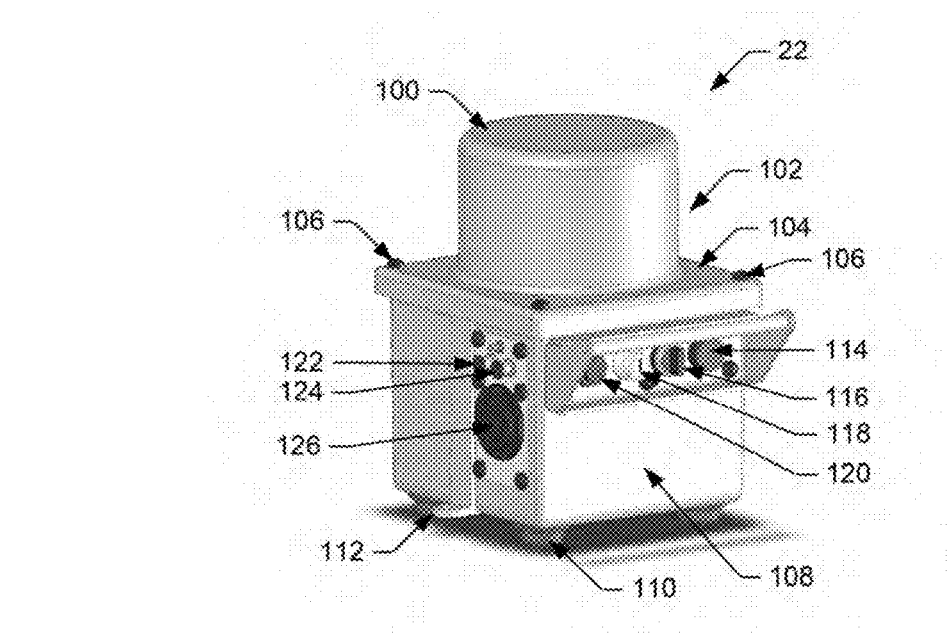
FIG. 9 is a 3D view of a mobile mesh device, according to one embodiment.

FIG. 9 is a 3D exterior view of the mobile mesh device 22, according to one embodiment. In the embodiment of FIG. 9, an external housing of the mobile mesh device 22 comprises two main compartments: an upper compartment 100 generally configured for housing the antenna system 32 and a lower compartment 108 generally configured for housing the hardware system components 34 and the software system components 36 shown, for example, in FIG. 3.

The upper compartment 100 of the external housing is configured to fully enclose the antenna system 32 (comprising, e.g., antennas 64/66 and ground plane 68) within a rugged, weather-proof enclosure. According to one embodiment, the upper compartment 100 may be formed so as to have a substantially cylindrical upper portion 102 formed integral with a substantially flat lower portion 104, as shown in FIG. 9. However, the upper compartment 100 is not limited to the particular configuration shown in FIG. 9 and may be formed to have substantially any shape, which is sufficient to cover and protect the antenna system 32 from the elements, as well as to provide a solid and impervious surface that can prevent the antennas housed therein from being damaged from external forces.

Housing the antenna system 32 within the upper compartment 100 provides a more rugged device, as compared to conventional wireless mesh devices that rely on externally mounted, weather-proof antennas. In addition, the cost of the antenna system 32 is greatly reduced because the antennas are protected from the elements by the upper compartment 100 and weather-proof or "outdoor" type antennas are not used. However, it is generally preferred that non-interfering materials be used to form the upper compartment 100, so as not to interfere with the antenna radiation pattern. Examples of non-interfering materials may include, but are not limited to, non-resonant plastics, such as Acrylonitrile butadiene styrene (ABS).

Similar to the upper compartment 100, the lower compartment 108 may have substantially any form needed to house the hardware system components 34 and the software system components 36 of the mobile mesh device 22, and in one embodiment, may be substantially cube shaped, as shown in FIG. 9. In some embodiments, feet 110 may be provided on the bottom side of the lower compartment 108 to provide a stable surface and to keep the bottom of the device from resting on the floor or other supporting surface. In some embodiments, the lower compartment 108 may include one or more anchoring structures 112 for anchoring the mobile mesh device 22 to a surface or structure.

In addition to housing the hardware system components 34 and the software system components 36 of the mobile mesh device 22, the lower compartment 108 may include a number indicator lights, switches and/or power and communication ports. In the exemplary embodiment shown in FIG. 9, the lower compartment 108 includes a battery power indicator light 114, an on/off switch with indicator light 116, an on/off switch lock 118, an Ethernet port 120, a solar power input port 122, a 12 V power port 124 and a 110 V power plug 126. Although not apparent in FIG. 9, the lower compartment 108 may also include venting ports on one or more sides to vent the warm air inside the compartment to the ambient environment. In addition, the various indicators, switches and ports may be weather-proofed so that the mobile mesh device 22 can be successfully used in outdoor applications.

Figure 10:
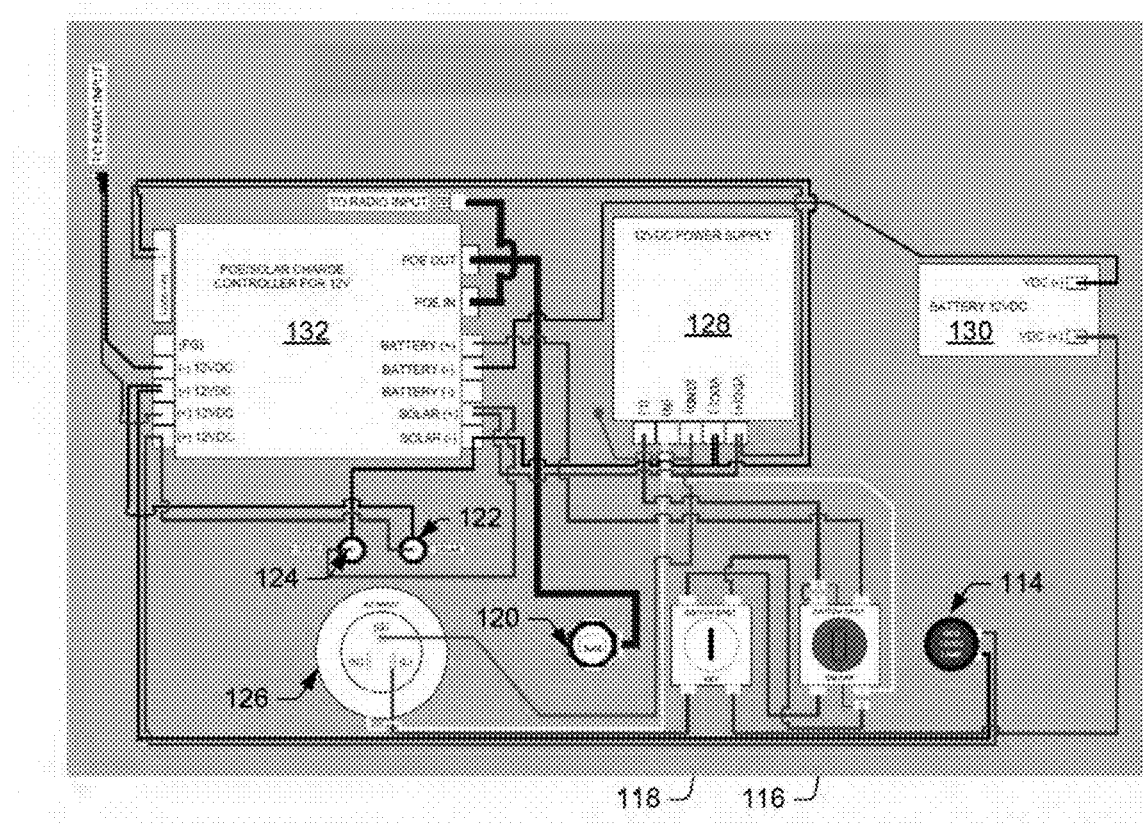
FIG. 10 is a schematic diagram illustrating various power supply options for the mobile mesh device shown in FIG. 9.

FIG. 10 is a schematic diagram illustrating various power supply options for the mobile mesh device 22. As shown in FIG. 10, the available power supply options may include a DC power supply (e.g., 12 VDC) 128 and a DC battery (e.g., 12 VDC) 130, both of which may be charged via the 110 VAC power plug 126. In some embodiments, an Ethernet port 120 may be included and used to supply Power over Ethernet (POE), and/or a solar panel can be connected to the mobile mesh device 22 via the solar power input port 122. A controller 132 is provided for managing and routing the various power supply options.

As made clear in the exemplary wiring diagram of FIG. 10, the on/off switch lock 118 allows the mobile mesh device to be activated/deactivated and locked by controlling the power flow from the 110 VAC power plug 126 and the battery 130 to the on/off switch 116. The on/off switch 116 turns the mobile mesh device on/off by connecting either the power supply 128 or the battery 130 to the controller 132.

The locking feature of the on/off switch lock enables the device to be locked in an off position for transport, and provides tamper resistance when deployed in the field.

The battery power indicator light 114 indicates whether the battery 130 or the solar input port 122 is supplying 12 volts to the 12V power port 124. When powered, the 12V power port 124 provides an outlet through which peripheral devices and user devices can be powered from the mobile mesh device 22. In addition to powering peripheral devices, the inclusion of a 12V power port 124 may essentially turn the mobile mesh device 22 into a portable power source from which users could charge cell phones and other portable electronic devices. This could be immensely useful in power outage situations.

It is worth noting that, while various ports/plugs may be provided to enable the mobile mesh device 22 to be connected to standard power wiring (such as an AC power line or Ethernet cable), the mobile mesh device 22 may be powered in the field solely by the embedded power supply 128, the battery 130 or an optional solar power array (see, e.g., FIG. 11) coupled to the solar power port 122. In other words, the mobile mesh device 22 does not require standard power wiring to function, as in the case of most conventional wireless mesh devices. This freedom enhances the portability of the mobile mesh device.

Figure 11:
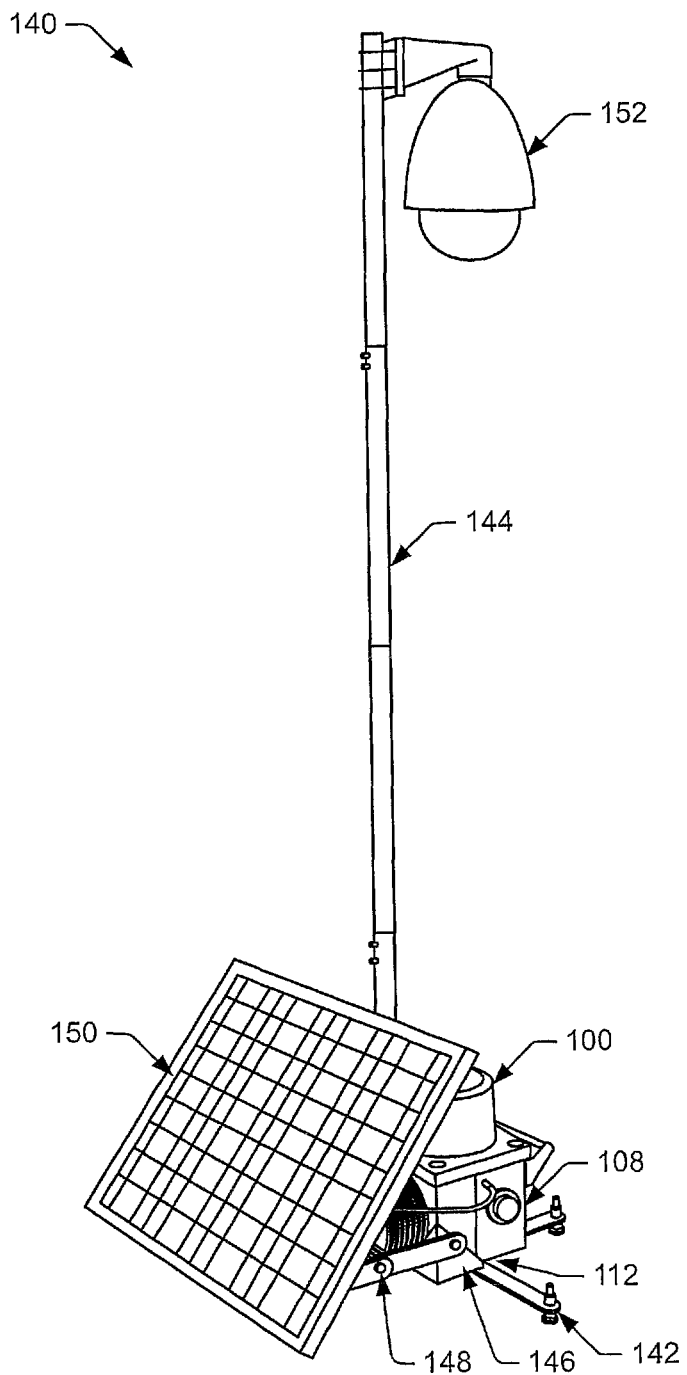
FIG. 11 is a 3D view showing the mobile mesh device of FIG. 9 attached to a pole mount configured for supporting a variety of peripheral devices.

In some embodiments, the lower compartment 108 may include means for anchoring the mobile mesh device 22 to other structures and/or peripheral attachments, such as cameras, directional antenna posts and solar mounts. For example, and as shown in FIG. 9, the lower compartment 108 may include one or more anchoring structures 112 for anchoring the mobile mesh device 22 to a surface or structure. One example of a structure to which the lower compartment 108 may be mounted is shown in FIG. 11. It is noted, however, that the mobile mesh device 22 may be mounted to substantially different structures or surfaces using potentially different anchoring structures, and is not strictly limited to only those structures shown in FIG. 11.

FIG. 11 is a 3D view showing the mobile mesh device 22 attached to a pole mount 140 generally comprising a four-legged base 142 coupled to a vertical pole 144. In the embodiment of FIG. 11, the lower compartment 108 of the mobile mesh device 22 is placed within a support structure 146, which is either coupled to the base 142 or the pole 144. In some embodiments, the lower compartment 108 may be anchored to the support structure 146 by inserting a mechanical fastener (e.g., a screw, nut and bolt, etc.) through the anchoring structure 112 of the mobile mesh device 22 and a corresponding structure on the support structure 146. Alternatively, magnets may be provided on the lower compartment 108 for anchoring the mobile mesh device to the pole mount 140, or another surface or structure. In some embodiments, a mounting structure 148 may be coupled to the support structure 146 for retaining a diagnostic tool (not shown) or an energy harvesting device, such as a solar panel 150. The mounting structure 148 may be rigidly fixed in place, or may be configured to provide an adjustable height and/or tilt angle. The pole 144 may be a fixed length or adjustable length pole and may be configured for receiving a variety of different peripheral attachments, such as a camera 152, one or more supplemental antennas (not shown), or an antenna mount 170 (see, FIG. 13) for retaining the upper compartment 100 of the mobile mesh device 22.

Figure 12:
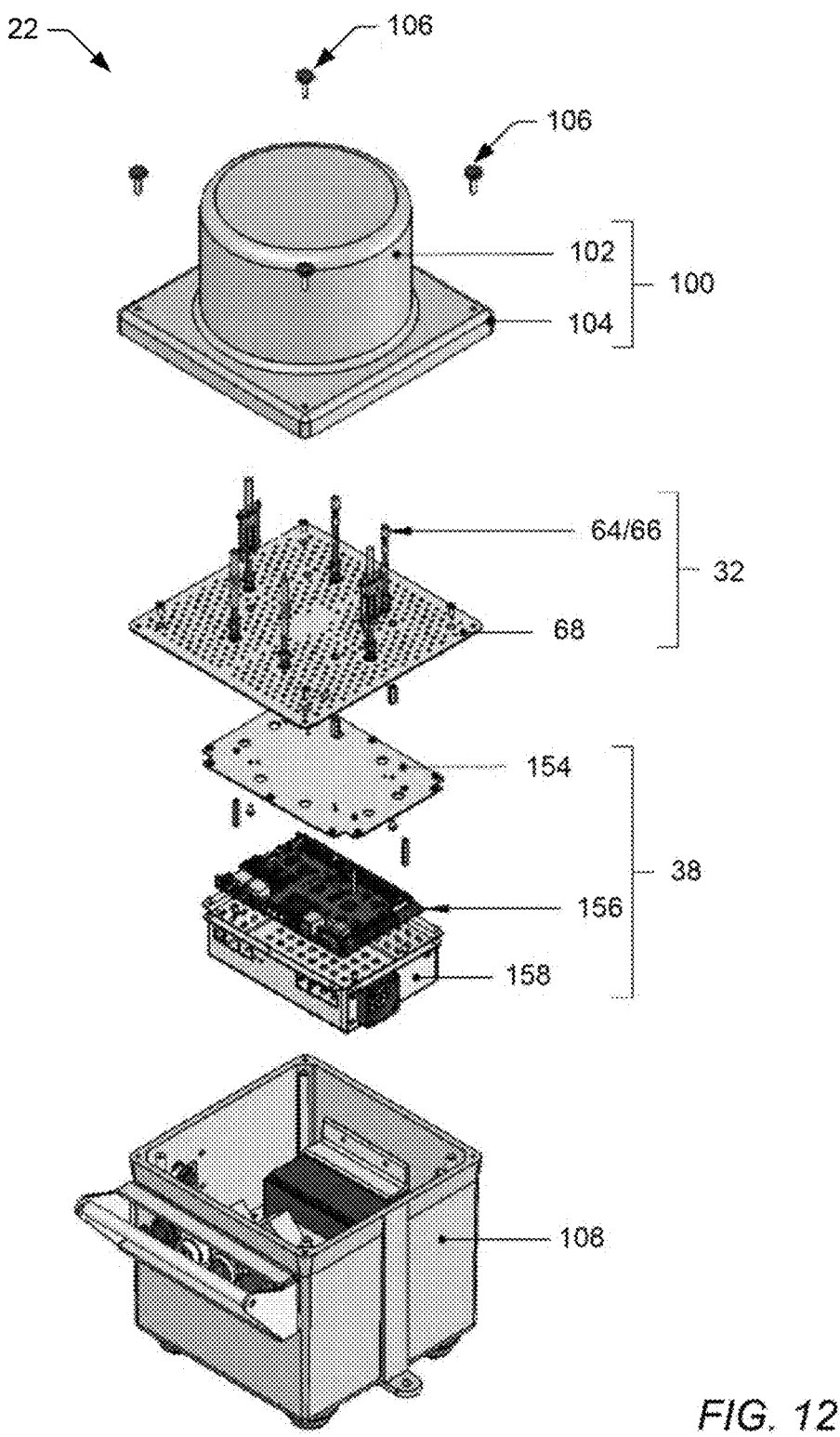
FIG. 12 is an exploded view of the mobile mesh device of FIG. 9 illustrating how the upper compartment of the device may be detached from a lower compartment of the device, according to one embodiment.

Returning to FIG. 9, the upper compartment 100 of the mobile mesh device 22 is preferably connected to the lower compartment 108 with a plurality of mechanical fasteners 106 (e.g., screws, nuts and bolts, latches, clips, etc.) and includes a weather-proofing material (e.g., a gasket) at the boundary of the two compartments to inhibit ingress of dirt, water or other contaminants. In some embodiments, it may be desirable to detach the upper compartment 100 from the lower compartment 108 of the mobile mesh device 22. FIG. 12 illustrates one manner in which this may be achieved.

FIG. 12 is an exploded view of the mobile mesh device 22 illustrating how the upper compartment 100 may be detached from the lower compartment 108, according to one embodiment. In the embodiment of FIG. 12, the upper compartment 100 may be detached from the lower compartment 108 by removing a plurality of screws 106 (or other mechanical fasteners) coupling the upper compartment 100 to the lower compartment 108. Once the screws 106 are removed, the upper compartment 100 may be removed to access components of the antenna system 32, which includes antennas 64/66 mounted on ground plane 68. In some embodiments, the antenna system 32 may be accessed by a user or technician to change a resonant frequency of one or more of the vertical dipole antennas 64 in accordance with the method shown in FIG. 7 and described above.

In other embodiments, it may be desirable to reduce interference from people, buildings, etc., and/or to facilitate line-of-sight point-to-point communications by raising the antenna system 32 and associated radio modules 38 above a certain height. This may be achieved in the mobile mesh device 22 by removing the mechanical fasteners 106 and detaching the upper compartment 100 from the lower compartment 108, as shown in FIG. 12. In this embodiment, however, the antenna system 32 (comprising antennas 64/66 and ground plane 68) and the radio modules 38 (comprising radio base plate 154, radio board 156 and radio housing 158) may be retained within or coupled to the upper compartment 100. Once detached from the lower compartment 108, the upper compartment 100 may be mounted at an elevated location spaced apart from the lower compartment 108. In some embodiments, a lid 109 (see, FIG. 14) may be used to cover the opening created in the lower compartment 108 when the upper compartment 100 is detached. The lid 109 may be coupled to the lower compartment 108 via a plurality of mechanical fasteners, similar to the manner in which the upper and lower compartments were attached.

Figure 13:
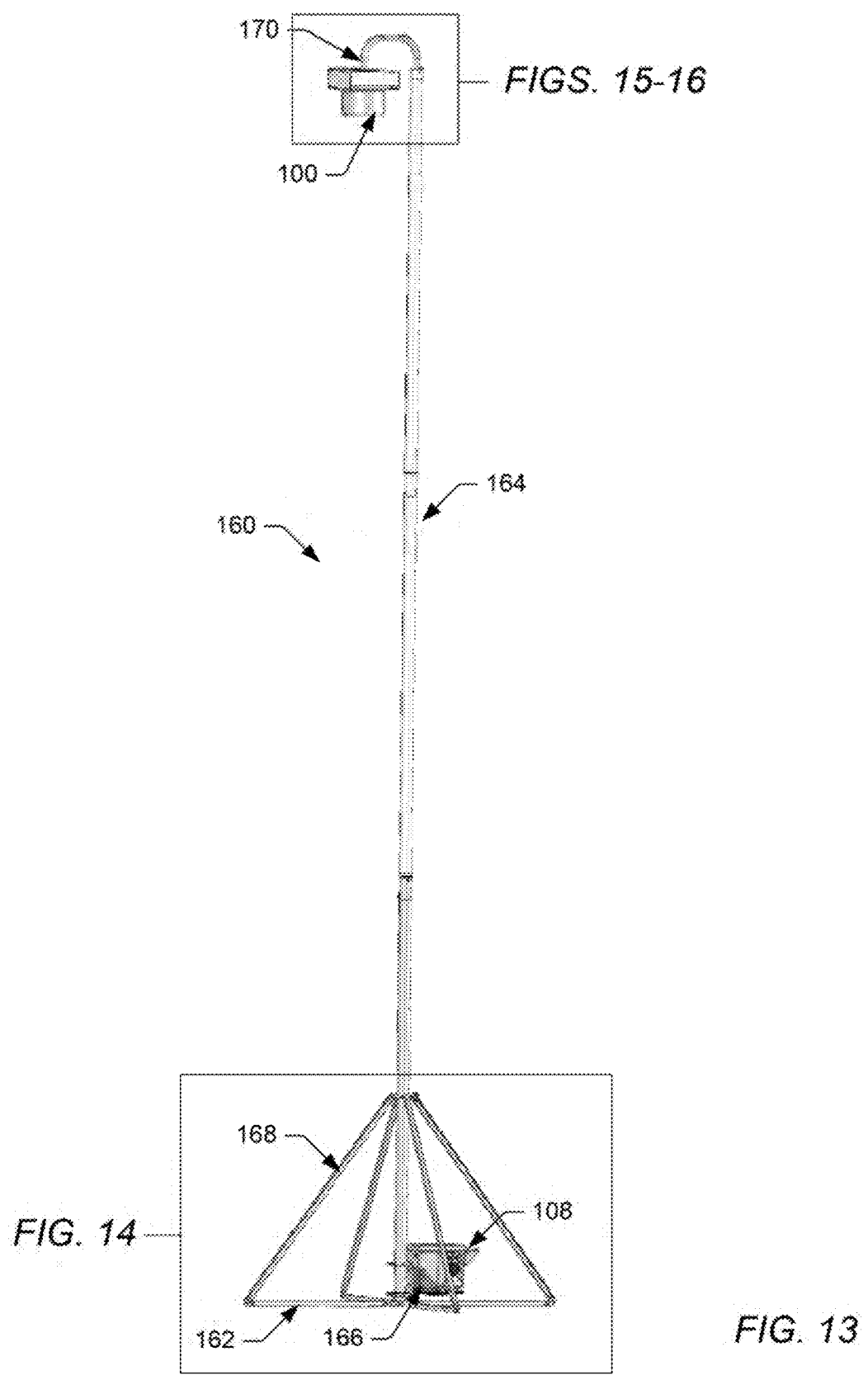
FIG. 13 is a 3D view showing the lower compartment of the mobile mesh device of FIG. 9 anchored to a base of a pole mount, while the upper compartment of the mobile mesh device is attached to an antenna mount at or near the top of the pole mount.
Figure 14:
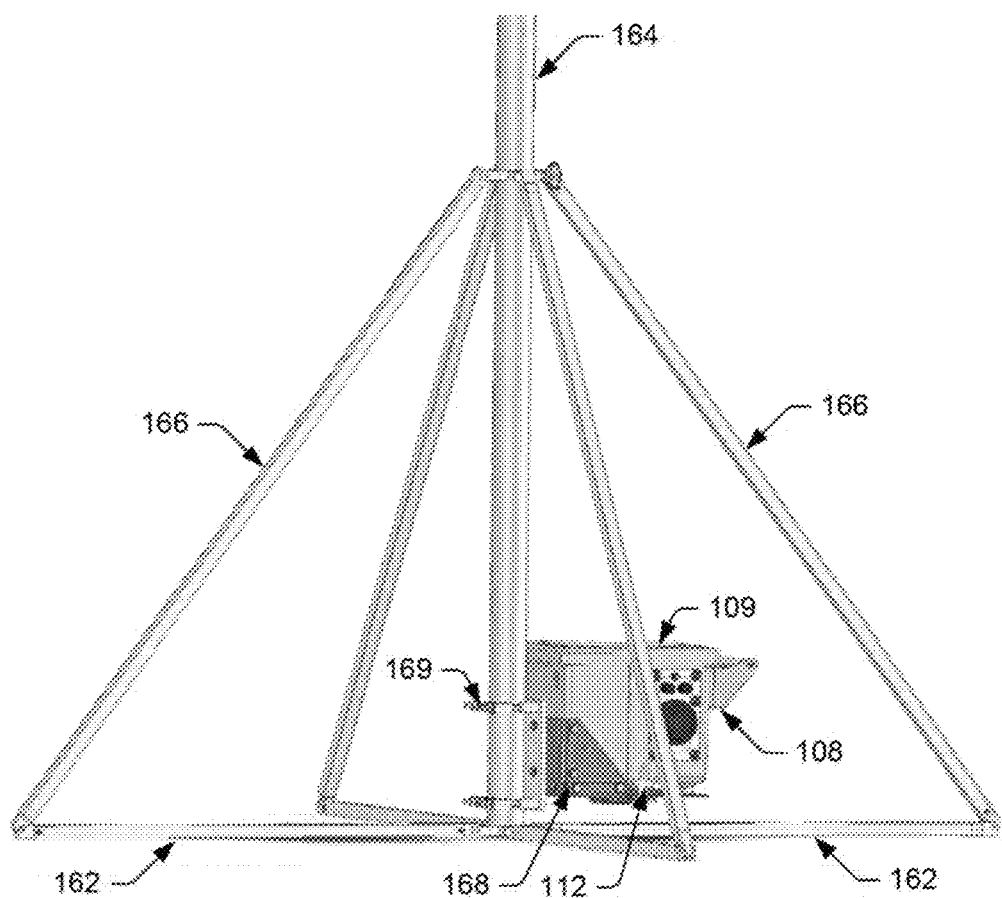
FIG. 14 is a magnified view illustrating how the lower compartment may be anchored to the base of the pole mount, according to one embodiment.
Figure 15:
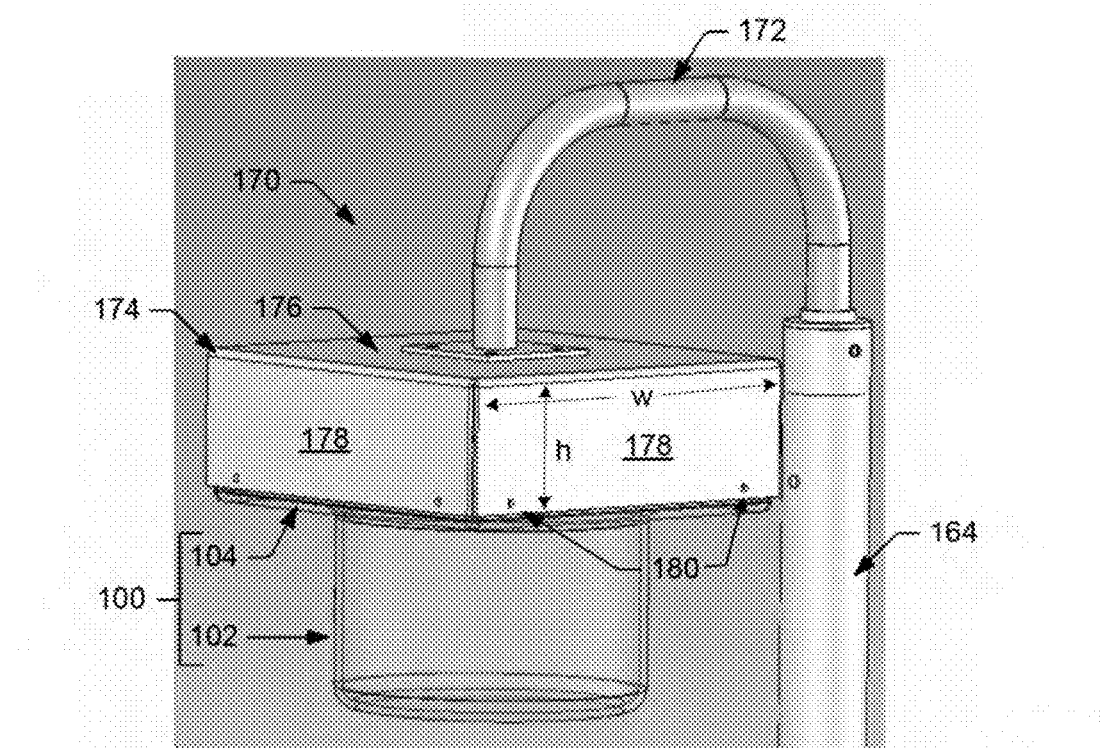
FIG. 15 is a magnified view illustrating how the upper compartment maybe attached to the antenna mount, according to one embodiment.
Figure 16:
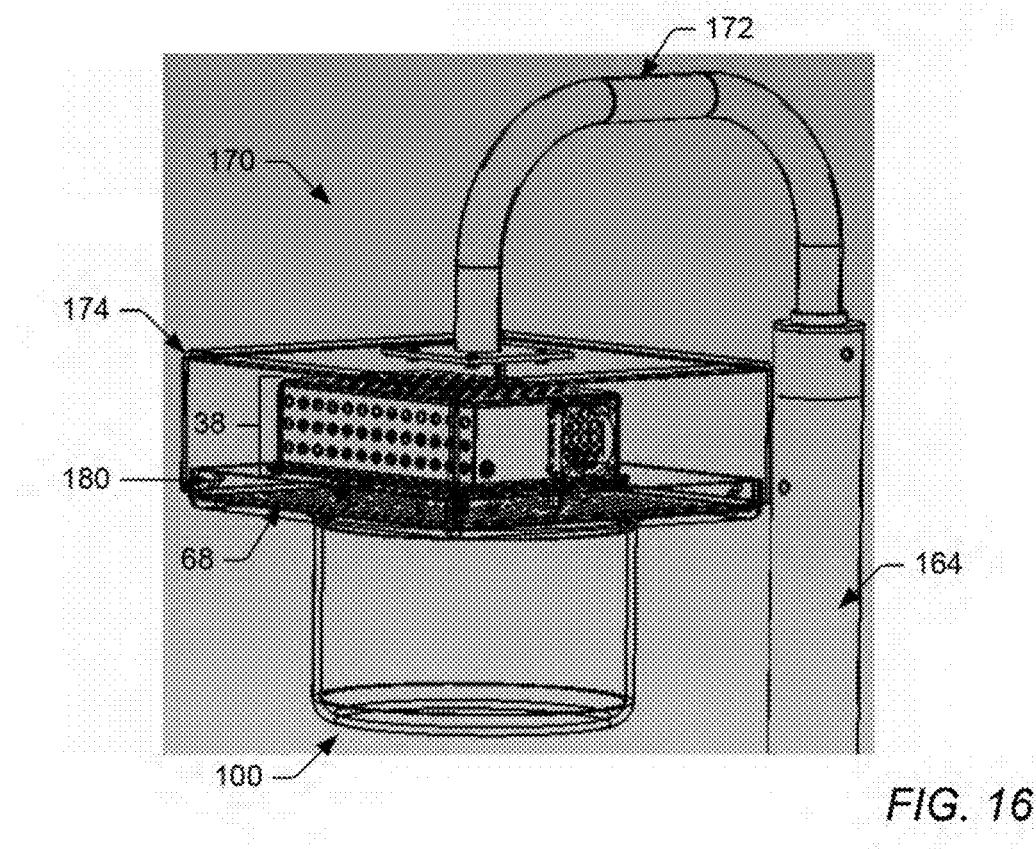
FIG. 16 is a magnified view illustrating exemplary antenna and radio components enclosed within the upper compartment and antenna mount.

FIGS. 13-16 illustrate how the upper compartment 100 may be mounted at an elevated location above the lower compartment 108, according to one embodiment. As shown in FIGS. 13-14, the lower compartment 108 of the mobile mesh device 22 may be anchored to a pole mount 160 comprising a four-legged base 162 coupled to a vertical pole 164. The pole mount 160 shown in FIG. 13 may be similar to the pole mount 140 shown in FIG. 11, or may be substantially different. For example, the pole 164 shown in FIG. 13 may be a fixed length or adjustable length pole and may be configured for receiving a variety of different peripheral attachments, similar to the pole 144 shown in FIG. 11. The height or length of the pole 164 may be configured as desired. In the embodiment of FIG. 13, however, a top portion of the pole 164 may be configured for receiving a mount 170 for retaining the upper compartment 100 of the mobile mesh device 22. Additional details of the mount 170 are illustrated in FIGS. 15 and 16 and described in more detail below. In some embodiments, the four-legged base 162 may comprise additional support legs 166 for improved stability.

As shown in FIG. 14, the lower compartment 108 of the mobile mesh device 22 may be placed within a support structure 168, which is coupled to the pole 164 via a mounting bracket 169. The lower compartment 108 may be anchored to the support structure 168 by inserting a mechanical fastener (e.g., a screw, nut and bolt, etc.) through the anchoring structure 112 of the mobile mesh device 22 and a corresponding structure on the support structure 168. It is noted, however, that the support structure 168 and mounting bracket 169 represent only one way in which the lower compartment 108 may be coupled to the pole mount 160. In other embodiments, the lower compartment 108 may be coupled to the base 162 or the pole 164 via alternative means (e.g., magnets), or may simply be placed on the floor adjacent to the pole mount 160.

FIG. 15 is a magnified 3D view illustrating how the upper compartment 100 of the mobile mesh device 22 may be attached to the antenna mount 170, according to one embodiment. In the embodiment of FIG. 15, the antenna mount 170 comprises a curved extension arm 172 and a cover 174. One end of the extension arm 172 is connected to the top portion of the pole 164, while the other end of the extension arm 172 is connected to a top surface 176 of the cover 174. The cover 174 may comprise substantially any shape and size needed to interface with the upper compartment 100 of the mobile mesh device 22 in a secure and weather-proof manner.

According to one embodiment, the cover 174 may be generally configured as an open-ended box having a top surface 176, four side surfaces 178 and a bottom opening. The widths (w) of the side surfaces 178 may be designed to receive and interface with the lower portion 104 of the upper compartment 100. In particular, the widths (w) of the side surfaces 178 may be only slightly larger than corresponding dimensions of the lower portion 104 of the upper compartment 100, so that the lower portion 104 can be inserted within the cover 174 and retained therein via a plurality of mechanical fasteners 180 (e.g., screws). In some cases, a weather-proofing material (e.g., a gasket) may be included at the boundary between the cover 174 and the lower portion 104 of the upper compartment 100 to inhibit ingress of dirt, water or other contaminants. In some embodiments (not shown in FIG. 13), the height (h) of the side surfaces 178 may be just large enough to accommodate the lower portion 104 of the upper compartment 100. In preferred embodiments, however, the height (h) of the side surfaces 178 may be designed to accommodate the radio modules 38, which are typically housed within the lower compartment 108 of the mobile mesh device 22. This embodiment is illustrated, for example, in FIG. 16.

FIG. 16 illustrates interior views of the cover 174 and the upper compartment 100. As shown in FIG. 16, the upper compartment 100 is essentially coupled to the antenna mount 170 upside down. In other words, the upper compartment 100 is mounted so that the antennas 64/66, which are shown to be coupled to a top surface of the ground plane 68 in FIG. 4, now extend downward into the upper compartment 100. The radio modules 38 remain coupled to a bottom surface of the ground plane 68 in this embodiment. When the upper compartment 100 is attached to the antenna mount 170, the radio modules 38 are fully enclosed within cover 174 of the antenna mount 170. In some embodiments, power and communication between the radio modules 38 and the lower compartment 108 of the mobile mesh device 22 is maintained by routing one or more cables (e.g., a power cable and a Power-Over-Ethernet cable) through the extension arm 172 and the pole 164.

The embodiment shown in FIGS. 13-16 provides several advantages. First, the embodiment shown in FIGS. 13-16 mounts the antenna system 32 upside down in an inverted ground plane configuration. By mounting the antenna system 32 such that the ground plane 68 is positioned above the antennas 64/66, the antenna radiation is directed back down towards the ground, so that more of the radiated energy goes down instead of up and out. Second, mounting the radio modules 38 along with the antenna system 32 within the antenna mount 170 avoids the cable signal loss that would otherwise occur if the antenna system was mounted a spaced distance away from the radio modules. Third, routing the cables through the extension arm 172 and the pole 164 ensures that the set-up remains weather-tight. These advantages represent significant improvements over conventional wireless mesh devices, which attempt to avoid interference or provide line-of-sight communications by mounting supplemental weather-proof antennas onto a pole and using cabling to couple the supplemental antennas to the radio modules housed within the wireless mesh device.

It is worth noting that while certain embodiments of the mobile mesh device 22 is shown in FIGS. 9-16, the mobile mesh device is not restricted to the particular embodiments shown in these figures and may be alternatively configured in other embodiments of the invention. In one example, the mobile mesh device 22 may include one or more additional/alternative ports for connecting other peripheral attachments (such as charging stations for cell phones, attachment of satellite phones, solar panels, additional battery packs, external radio systems, POE power both in and out, connectivity to wired network nodes, etc.) that may be used to extend the functionality of the mobile mesh device 22.

Returning to FIG. 3, the mobile mesh device 22 includes a number of hardware and software system components that operate together to provide the claimed functionality. As shown in FIG. 3, the hardware components may include a number of radio modules 38, which may be used to transmit and receive network communications via the antennas 64/66 included within the antenna system 32. In general, any number of radio modules 38 may be used to provide any combination of cellular access, 802.11 access, mesh connectivity and location-based services. In one example, two radio modules 38 may be included within the mobile mesh device 22 to provide both cellular and 802.11 access for the mesh. In the illustrated embodiment, however, four radio modules 38 are included to provide cellular access, 802.11 access, mesh connectivity and location-based services. While the cellular antennas 66 shown in FIG. 4 are typically connected to the cellular radio module of FIG. 3, the 802.11 antennas 64 shown in FIG. 4 can be connected to any of the three 802.11 radio modules in any combination. This flexible system configuration provides the advantages of frequency selection and the ability to dynamically assign combinations of radio/antennas to a specific use case. This allows for a more flexible design platform for network engineers.

As shown in FIG. 3, the radio modules 38 may be connected to a network processor through a number of mini-PCI slots 40 and a virtual bus 42 included on a single board computer 44. According to one embodiment, the single board computer 44 may be a rugged network processor board designed for a range of outdoor applications. In addition to the mini-PCI slots 40 and virtual bus 42 shown in FIG. 3, the network processor board may include a single-core or multi-core processor, various types of embedded memory and memory expansion slots (e.g., EEPROM, SDRAM, FLASH, etc.), various communication and input/output ports (e.g., Ethernet, USB, RS232, general purpose digital I/O, etc.), and an OpenWrt board support package for Linux operating systems, as well as other standard and optional components not shown in FIG. 3.

The software components 36 shown in FIG. 3 may generally include an embedded operating system (OS) 50, a user interface 52 for configuring the wireless mesh network 30 and a number of software packages 54 designed to implement specific functionality within the mesh device. Each of these components will be described in more detail below.

According to one embodiment, the user interface 52 provides an interface through which a user or technician can view, set or modify various virtual LAN (VLAN), provisioning and routing characteristics for the wireless mesh network 30. The OS 50 is an OpenWrt operating system, which is provided by Linux and commonly used in embedded devices to route network traffic. The OpenWrt operating system is desirable due to its flexibility and writable root file system, which enables users to add, remove or modify any file. The OpenWrt operating system also provides a package manager, which enables users to install and remove software, with access to a package repository currently containing about 3500 packages. However, the user interface 52 and software packages 54 shown in FIG. 3 are not part of the standard Linux distribution found in the package repository. These packages, in conjunction with various hardware components shown in FIG. 3, enable the mobile mesh device 22 to provide more specific mesh functionality.

According to one embodiment, the software packages 54 may include one or more of the following: a remote configuration engine 56, a real-time location system (RTLS) engine 58, a cellular interface package 60 and a packet capture and network analysis engine 62. Additional software packages not specifically mentioned herein may also be included to provide additional functionality. As is typical, the software packages 54 are generally implemented as program instructions, which are stored within a storage medium and executed by a processor. In most cases, the storage medium and the processor may both be included within the hardware components 34 of the mobile mesh device 22. For example, the processor may be a single-core or multi-core processor provided on the network processor board of the mobile mesh device 22. Likewise, the storage medium may comprise one of the various types of embedded memory and/or memory expansion slots (e.g., EEPROM, SDRAM, FLASH, etc.) also provided within the mobile mesh device 22. In some cases, however, one or more of the software packages 54 may use software services, which are not stored within a storage medium of the mobile mesh device 22 to facilitate its intended functionality.

The remote configuration engine 56, for example, enables a user to remotely configure and manage the mobile mesh devices 22 in the wireless mesh network 30. According to one embodiment, the remote configuration engine 56 may use a combination of geographical mapping software (e.g., Google Earth) and a cloud management "software as a service" (SAAS) system for remote management and configuration capabilities. In addition to managing the mobile mesh devices 22, it may also be possible to remotely manage client devices, sensors or other cellular or Wi-Fi enabled devices coupled to the mesh network 30 using the remote configuration engine 56.

The real-time location system (RTLS) software engine 58 works in conjunction with the RTSL hardware engine 48 (e.g., a RTLS transceiver) added to the single board computer 44 to provide a variety of location-based services. In some embodiments, the RTLS software/hardware engines 58/48 may be used to identify and manage physical device assets and people within the mesh network 30. In particular, the RTLS engines 58/48 may be used to answer the question of "who/what is present?" as opposed to simply determining the location of people/assets within the network. In some embodiments, the RTLS engines 58/48 may also provide alerting services based on events triggered by 802.11 devices or RTLS tags, and in some cases, to trigger actions based on these alerts. These types of location based services are not currently found in temporary and ad hoc wireless networks.

Temporary wireless networks are inherently difficult to manage, and RTLS on these types of networks is usually not viable, due to the necessary fingerprinting, site surveying or floor plan layouts typically needed to determine location accurately within a building or outside. In addition, most commonly known RTLS networks rely on a controller based central management scheme, which is unfriendly to temporary wireless networks, and usually track people/asset location while ignoring presence based data as not useful (such as "who/what is present?").

The RTLS engines 58/48 included within the mobile mesh device 22 improve upon conventional RTLS engines by providing both presence and alerting services in a temporary and/or rapidly deployable wireless mesh network 30 without the need to first fingerprint or map the network coverage area. In general, the RTLS engines 58/48 described herein may track and identify Wi-Fi enabled devices (such as client devices 26 and people carrying those devices), as well as RTLS tags 28.

According to one embodiment, the RTLS engines 58/48 may track and identify Wi-Fi enabled devices by intercepting or "sniffing" data packets or beacons transmitted from the Wi-Fi devices. In some cases, the RTLS engines 58/48 may work in conjunction with the packet capture and network analysis engine 62 to capture Wi-Fi packets transmitted from Wi-Fi enabled devices or tags 28.

For example, a Wi-Fi enabled device may periodically transmit beacons containing a MAC address or other information identifying the Wi-Fi enabled device to the network. RTLS tags 28 may also transmit a periodic signal containing a unique MAC address using the IEEE 802.11 protocol. The RTLS engines may capture or "sniff" the periodic signals transmitted from the devices and tags, and use the MAC addresses or other identifying information (such as a device or tag ID) to identify the transmitting device. In some cases, a database of MAC addresses can be maintained to identify Wi-Fi devices and tags present on the network. Such a database may be used to identify both known network users, as well as unknown users that may or may not have permission to access the network.

The RTLS engines 58/48 may determine the location of the Wi-Fi enabled devices and tags based on data packets captured and identified by a plurality of the mobile mesh devices within the wireless mesh network. In some embodiments, the RTLS engines 58/48 within a mobile mesh device 22 may use one or more locating algorithms, such as trilateration, multilateration, or triangulation, to determine the location of a transmitting device using measurements performed by a plurality of mobile mesh devices on a captured data packet. In one example, a plurality of mobile mesh devices 22 that "see" a Wi-Fi enabled device or RTLS tag may perform a received signal strength measurement (e.g., RSSI), or measurements of other key performance indicators, on a data packet, which is transmitted by the Wi-Fi enabled device or RTLS tag and captured by the mobile mesh devices. In some cases, a rough location may be determined from the mobile mesh device that measures the greatest signal strength. In other cases, a mobile mesh device may determine a rough location of the transmitting Wi-Fi enabled device or RTLS tag based on triangulation of received signal strength measurements obtained from a plurality of mobile mesh devices, and may use its own GPS location to determine a more exact location of the transmitting device. In another example, a multilateration or trilateration technique based on time difference of arrival (TDOA) measurements performed by three or more mobile mesh devices may be used to locate the Wi-Fi enabled device or RTLS tag transmitting the data packets. While other methods may be used, the RTLS engines 58/48 described herein do not use or rely on a pre-existing fingerprint or map of the network coverage area to locate a transmitting device within a wireless mesh network.

In general, the RTLS engines 58/48 may be configured to provide a variety of different presence and alerting services. For example, the RTLS engines 58/48 may detect the presence of a MAC address from a Wi-Fi enabled device or RTLS tag that has moved outside of its usual or designated location (such as a misplaced asset, or an employee that left work), or within an area that it shouldn't be (such as an unauthorized person inside a building after hours). In other examples, RTLS tags placed on various sensors (such as moisture sensors, motion detectors, temperature/smoke detectors, etc.) throughout the mesh network may be used to locate and identify a particular sensor issuing an alert.

In some embodiments, the RTLS engines 58/48 may trigger a response or action to the event. For example, detecting the presence of an unauthorized MAC address in a particular location, or detecting motion from a motion sensor at an inappropriate time or location may cause the RTLS engines 58/48 to trigger an appropriate response, such as logging the presence of the unauthorized MAC address or the detected motion, or activating a camera to record activity in the identified area. On the other hand, detecting a leak from a moisture sensor may cause the RTLS engines 58/48 to trigger a response to shut off the water source to the leak, or some other appropriate response. While the realm of possible detectable events and actionable responses is substantially unlimited, it is the RTLS engines 58/48 that enable accurate real-time location of the events in a temporary or rapidly deployable network that renders these services unique.

According to one embodiment, the cellular interface package 60 works in conjunction with the small cell gateway 46 added to the single board computer 44 to provide routing of cellular voice and data signals through and out of the wireless mesh network 30 when there is inadequate cell coverage or no access to a cellular network. In one embodiment, the small cell gateway 46 may be a femtocell, although other small cell gateways may be included, and may be used to intercept cellular voice and data signals, convert the cellular signals to another communication protocol and to re-route those signals throughout and beyond the wireless mesh network 30. In some embodiments, the small cell gateway 46 may be combined with a Voice-over-IP (VoIP) gateway system and/or a satellite modem (not shown) to intercept cellular signals, convert the cellular signals to Internet Protocol (IP) or satellite signals and to re-route those signals outside of the mesh network over the Internet or through a satellite link.

By including a small cell gateway 46 and cellular interface package 60 within the mobile mesh device 22, the wireless mesh network 30 can advantageously provide cellular service within areas (such as inside buildings, mines, tunnels and other areas that block cellular signals) where cell coverage is weak or not possible with standard cellular base stations. Including such components within the mobile mesh device 22 also provides the ability to quickly reestablish cellular service during black outs or loss of power within a building.

In some embodiments, the small cell gateway 46 and cellular interface package 60 may work in conjunction with the RTLS engines 58/48 to provide a particularly unique service. In most femtocell applications, for example, the user must declare which cellular phone numbers are allowed to connect to the femtocell, usually via a web interface provided by the cellular network operator. However, by combining the small cell gateway 46 and cellular interface package 60 with the RTLS engines 58/48, the mobile mesh device 22 provides a unique mechanism with which to bypass this step and automatically reroute cellular calls upon detecting a nearby cellular or Wi-Fi enabled device. For example, the RTLS engines 58/48 may detect a (Wi-Fi enabled) cell phone and may identify a known or unknown MAC address or device ID from the signals transmitted thereby. The RTLS engines 58/48 may then notify the cellular interface package 60 that a cell phone is within the mesh network, and depending on the security parameters of the network, the cellular interface package 60 may automatically re-route any cellular calls transmitted from the cell phone through the small cell gateway 46, the VoIP gateway system or the satellite modem. Such re-routing may or may not be transparent to the cell phone user.

In addition to providing cellular coverage, where none or very little signal strength exists, the ability to re-route cellular calls through the small cell gateway 46, VoIP gateway system or satellite modem of the mobile mesh device 22 reduces the load on the cell phone's battery by preventing the cell phone from continually boosting the power level in an attempt to connect. In addition to battery conservation, the call quality on the cell phone side would be greatly improved, as the signal would be transmitted to the cell phone from a nearby mobile mesh device 22, as opposed to a distant cell tower.

A highly portable, self-contained mobile mesh device 22 has now been described in accordance with one embodiment. As noted above, the mobile mesh device 22 may be used to provide a temporary and/or rapidly deployable wireless mesh network, either outside or inside buildings, with no network or power wiring required. The mobile mesh device 22 contains a number of unique features that enable the mobile mesh device 22 to be deployed and configured for operation in a matter of minutes without the need for a skilled technician. In addition to providing quick and easy network connectivity, the mobile mesh device 22 provides location-aware functionality about devices and tags within the vicinity of the network, supports remote site sensor monitoring and video surveillance, and is capable of local or remote configuration and management. The mobile mesh device 22 is also designed to accept a variety of external peripheral attachments that may be used to further extend its capabilities and functionalities, and can be used as a portable power source for charging external devices and/or as a gateway for automatically detecting and rerouting cellular calls or other signals transmitted from a cell phone within the vicinity of the mesh network.

As noted above, the mobile mesh device 22 has a ruggedized, weather resistant form factor that is uniquely configured for enclosing a plurality of antennas within an upper compartment 100 of the mobile mesh device, and for enclosing various hardware and software components within a lower compartment 108 of the mobile mesh device. In some embodiments, the upper and lower compartments of the mobile mesh device 22 may be detached for accessing the antennas enclosed therein and altering the resonant frequency of one or more of the vertical dipole antennas 64. In other embodiments, the upper and lower compartments of the mobile mesh device 22 may be detached, so that the antenna system 32 and radio modules 38 can be mounted on a pole mount or other structure to reduce interference, improve antenna radiation characteristics and/or facilitate line of sight communications.

A Second Exemplary Embodiment of a Mobile Mesh Device

An alternative embodiment of a mobile mesh device 182 is shown in FIGS. 17-20. In general, the mobile mesh device 182 shown in FIGS. 17-20 differs from the mobile mesh device 22 described above by trading reduced functionality for a substantially smaller form factor and external housing design. Instead of comprising two distinct compartments (i.e., an upper compartment 100 and lower compartment 108), the external housing of the mobile mesh device 182 shown in FIGS. 17-20 comprises a single compartment, which is configured for enclosing only a subset of the components included within the mobile mesh device 22.

According to one embodiment, the substantially smaller mobile mesh device 182 may be configured for housing only the antenna system and associated radio modules. In some embodiments, the mobile mesh device 182 may further include various network, navigational and/or power options. A mobile mesh device 182 having a smaller form factor and reduced functionality may be desired for use in or on vehicles (e.g., taxis, buses, trains, service or emergency vehicles, etc.), buildings or other structures to provide mobile, temporary and/or rapidly deployable network connectivity.

Figure 17:
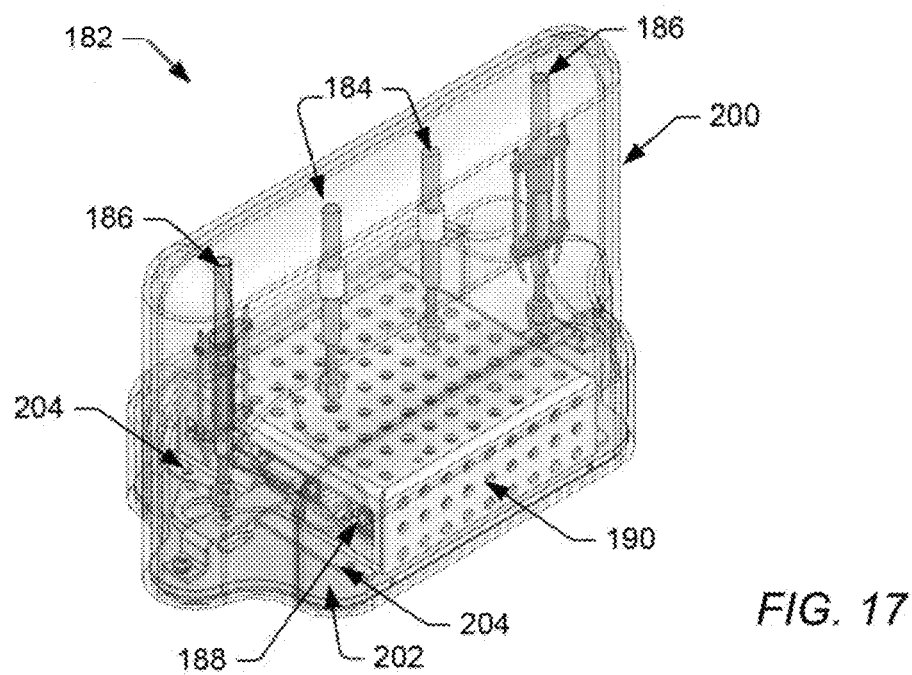
FIG. 17 is a 3D view illustrating an alternative embodiment of a mobile mesh device, wherein an external housing of the mobile mesh device shown in FIG. 17 comprises a single compartment for housing only a subset of the components included within the mobile mesh device of FIG. 9.

As shown in FIG. 17, the mobile mesh device 182 may comprise one or more end-fed, vertical dipole antennas 184 for wireless area network (e.g., IEEE 802.11a/b/g/n/s) communications and one or more shock-excited vertical dipole antennas 186 for cellular communications (e.g., 3G, 4G, LTE). In one preferred embodiment, the mobile mesh device 182 may include two end-fed, vertical dipole antennas 184 and two shock-excited vertical dipole antennas 186, as shown in FIG. 17. The end-fed, vertical dipole antennas 184 may be configured for operating in the 2.4 GHz band, the 5 GHz band, or any other licensed or unlicensed radio frequency band. In some embodiments, one or more of the vertical dipole antennas 184 may include a channel selection pin (not shown) for altering a resonant frequency of the antenna. However, a channel selection pin may be omitted in other embodiments when access to the antenna system is prohibited or difficult. In some embodiments, the antennas 184/186 may be mounted onto a top surface of radio housing 190, which encloses one or more radio modules 188 and acts as a ground plane for the antennas. In other embodiments, a separate antenna mounting plate or ground plane may be provided, similar to the embodiment described above. In addition to radio modules 188, additional components or ports may be included within the radio housing 190 for providing various network (e.g., Ethernet), navigational (e.g., GPS) and/or power (e.g., AC or DC) options.

Figure 18:
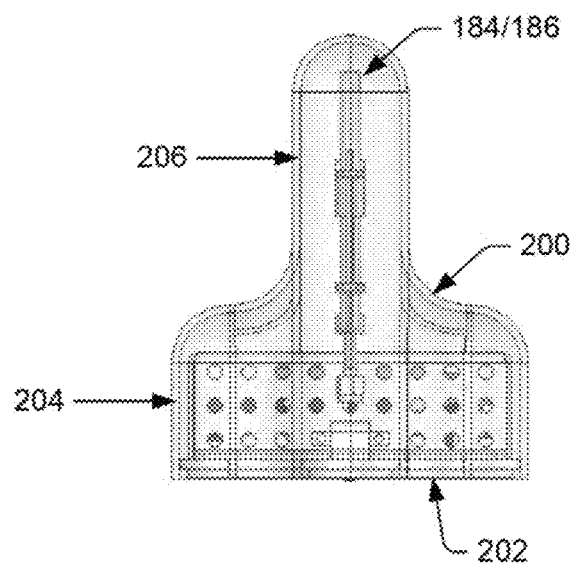
FIG. 18 is a side view of the mobile mesh device shown in FIG. 17.
Figure 19:
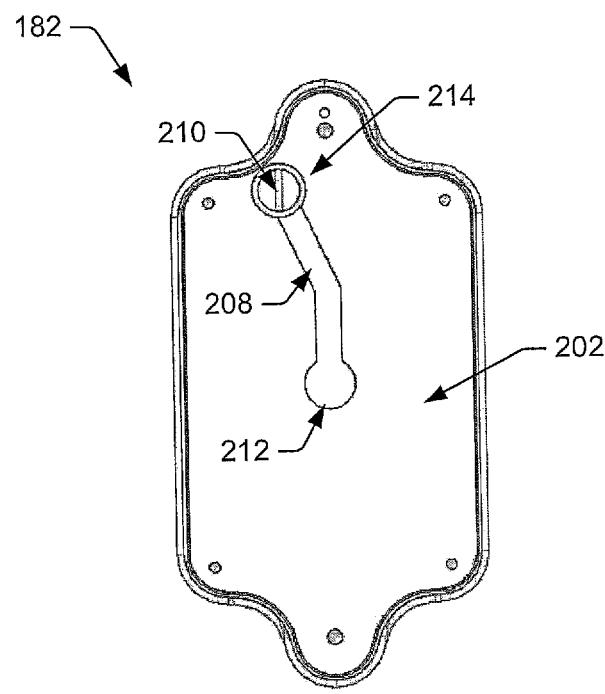
FIG. 19 is a bottom view of the mobile mesh device shown in FIG. 17 illustrating one manner in which the mobile mesh device may be attached to a surface or structure.

In FIGS. 17-19, all device components are fully enclosed within the single compartment of the mobile mesh device 182, which is formed by coupling external housing 200 to bottom plate 202. In some embodiments, the radio housing 190 may be anchored to the bottom plate 202 by inserting screws through holes 204 in the radio housing 190. After covering the device components with the external housing 200, the external housing 200 may be coupled to the bottom plate 202 by one or more mechanical fasteners (e.g., screws and bolts). In some embodiments, a weather-proofing material (e.g., a gasket) may be included at the boundary between the external housing 200 and the bottom plate 202 to inhibit ingress of dirt, water or other contaminants.

FIG. 18 is a side view illustrating an exemplary shape and size of the mobile mesh device 182 according to one embodiment. As shown in FIG. 18, external housing 200 may have a relatively small, streamlined form factor designed specifically for accommodating the antennas 184/186 and radio housing 190. In one example, the external housing 200 may comprise a relatively wider lower portion 204 for housing the radio housing 190 and a relatively narrower upper portion 206 for housing the antennas 184/186. A contour of the external housing 200 may generally follow the contour of the components housed therein. However, the external housing 200 is not limited to the particular configuration shown in FIGS. 17-18 and may be formed to have substantially any shape, which is sufficient to cover and protect the antennas 184/186 from the elements, as well as to provide a solid and impervious surface that can prevent the antennas housed therein from being damaged from external forces.

Figure 20:
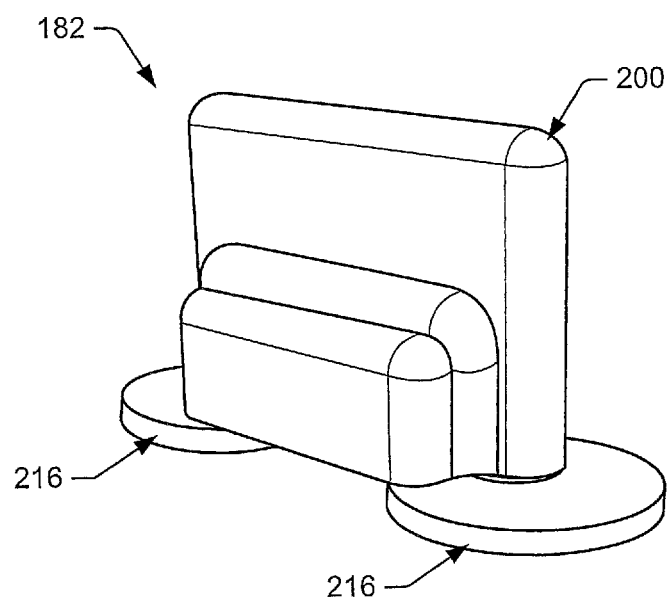
FIG. 20 is a 3D view of the mobile mesh device shown in FIG. 17 illustrating another manner in which the mobile mesh device may be attached to a surface or structure.

FIGS. 19-20 provide examples of various ways in which the mobile mesh device 182 may be attached to a surface or structure. In the exemplary embodiment of FIG. 19, a groove or slot 208 is formed in the bottom plate 202 and configured for receiving a pin, bolt or similar component 210, which is fixedly attached at one end to a surface or structure. The mobile mesh device 182 may be attached or mounted onto the surface or structure by inserting component 210 into a receiving end 212 of the slot 208 and sliding the component 210 to the opposite end 214 of the slot 208. Alternatively, the mobile mesh device 182 may comprise one or more magnetic feet 216 for magnetically adhering to a metal surface or structure, as shown for example, in FIG. 20. The one or more magnetic feet 216 may be formed having substantially any shape or size. Other means for attaching the mobile mesh device 182 to a surface or structure may also be used.

It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. An end-fed dipole antenna comprising:
an upper radiative element and a lower radiative element which are coupled back to back at a center feed point of the end-fed dipole antenna; and
an electrically conductive channel selection pin coupled onto a transmission feed line of the end-fed dipole antenna at a position below and spaced apart from the lower radiative element, wherein the position of the electrically conductive channel selection pin can be adjusted up or down along an axis of the end-fed dipole antenna to change a resonant frequency of the end-fed dipole antenna.

2. The end-fed dipole antenna as recited in claim 1, wherein the transmission feed line is routed through the lower radiative element along the axis, wherein one end of the transmission feed line is coupled to the center feed point for driving the first and second radiative elements, and wherein an opposite end of the transmission feed line is coupled to an input connector of the end-fed dipole antenna.

3. The end-fed dipole antenna as recited in claim 1, wherein a length of the first radiative element and the second radiative element is approximately equal to one-quarter (¼) of a wavelength of a resonant frequency of the end-fed dipole antenna.

4. The end-fed dipole antenna as recited in claim 1, wherein the electrically conductive channel selection pin is coupled onto the transmission feed line of the end-fed dipole antenna via a compressive force.

5. The end-fed dipole antenna as recited in claim 4, wherein the electrically conductive channel selection pin comprises a stiff metal wire formed so as to include a wound section, which is configured to provide the compressive force, and wherein the wound section is terminated at each end with a wire element that extends away from the wound section.

6. The end-fed dipole antenna as recited in claim 5, wherein a length of each of the wire elements is approximately equal to one-quarter (¼) of a wavelength of a resonant frequency of the electrically conductive channel selection pin.

7. The end-fed dipole antenna as recited in claim 4, wherein the transmission feed line comprises a plurality of markings, each corresponding to a different frequency or channel within an operating frequency band of the end-fed dipole antenna, and wherein the resonant frequency of the end-fed dipole antenna is changed by adjusting the position of the electrically conductive channel selection pin from one of the plurality of markings to a different one of the plurality of markings.

8. A method for setting or adjusting a resonant frequency of a dipole antenna comprising an upper radiative element coupled to a lower radiative element at a center feed point of the dipole antenna, and a transmission feed line routed through the lower radiative element and coupled to the center feed point for driving the upper and lower radiative elements, wherein the method comprises:
  measuring one or more key performance indicators of a signal generated or received by the dipole antenna; and
  adjusting a position of an electrically conductive channel selection pin to change the resonant frequency of the dipole antenna, if the one or more key performance indicators indicate the dipole antenna is currently tuned to a busy or noisy frequency, wherein the electrically conductive channel selection pin is coupled onto the transmission feed line of the dipole antenna and positioned below and spaced apart from the lower radiative element.

9. The method as recited in claim 8, wherein the dipole antenna is enclosed entirely within an external housing of a wireless communication device, and wherein prior to said adjusting, the method comprises accessing the dipole antenna enclosed entirely within the external housing of the wireless communication device.

10. The method as recited in claim 9, wherein said accessing comprises removing one or more mechanical fasteners used to attach an upper compartment to a lower compartment of the external housing, and removing the upper compartment to access the dipole antenna.

11. The method as recited in claim 8, wherein the electrically conductive channel selection pin comprises a wound section coupled onto the transmission feed line of the dipole antenna via a compressive force and a pair of wire elements extending off each end of the wound section, and wherein said adjusting comprises:
  squeezing the pair of wire elements together to remove the compressive force from the transmission feed line;
  sliding the electrically conductive channel selection pin up or down along the axis of the dipole antenna to a new position; and
  releasing the pair of wire elements to reapply the compressive force to the transmission feed line at the new position.

12. The method as recited in claim 11, wherein the new position corresponds to one of a plurality of markings on the transmission feed line, wherein each of the plurality of markings corresponds to a different frequency or channel within an operating frequency band of the dipole antenna.

13. A mobile mesh device for use within a wireless mesh network, the mobile mesh device comprising a plurality of dipole antennas, which are enclosed entirely within an external housing of the mobile mesh device and configured to forward network traffic, wherein at least one of the dipole antennas comprises:
  a channel selection pin whose position can be adjusted up or down along an axis of the dipole antenna to change a resonant frequency of the dipole antenna;
  wherein the channel selection pin comprises a stiff metal wire formed so as to include a wound section, which is terminated at each end with a one-quarter (¼) wavelength wire element that extends away from the wound section.

14. The mobile mesh device as recited in claim 13, wherein the channel selection pin is coupled onto a transmission feed line of the dipole antenna via a compressive force provided by the wound section of the channel selection pin.

15. The mobile mesh device as recited in claim 13, wherein a length of each of the one-quarter (¼) wavelength wire elements is approximately equal to one-quarter (¼) of a wavelength of a resonant frequency of the channel selection pin.

16. The mobile mesh device as recited in claim 14, wherein the transmission feed line comprises a plurality of markings, each corresponding to a different frequency or channel within an operating frequency band of the dipole antenna, and wherein the resonant frequency of the dipole antenna is changed by adjusting the position of the channel selection pin from one of the plurality of markings to a different one of the plurality of markings.

17. The mobile mesh device as recited in claim 13, wherein an external housing of the mobile mesh device comprises an upper compartment configured for housing the plurality of dipole antennas and a lower compartment configured for housing hardware and software components of the mobile mesh device, and wherein the upper compartment is coupled to the lower compartment via a plurality of mechanical fasteners.

18. The mobile mesh device as recited in claim 17, wherein the plurality of mechanical fasteners are removed to detach the upper compartment from the lower compartment and gain access to the plurality of dipole antennas housed within the upper compartment of the external housing.

19. The mobile mesh device as recited in claim 17, further comprising a weather-proofing material at a boundary between the upper compartment and the lower compartment to inhibit ingress of dirt, water or other contaminants within the external housing.

20. The mobile mesh device as recited in claim 13, wherein an external housing of the mobile mesh device consists of a single compartment configured for housing the plurality of dipole antennas and one or more radio modules configured for transmitting and receiving network communications via the plurality of dipole antennas.

* * * * *